US012596678B2

(12) United States Patent
Zhang

(10) Patent No.: US 12,596,678 B2
(45) Date of Patent: Apr. 7, 2026

(54) HYPERGRAPH DATA STORAGE METHOD AND APPARATUS WITH TEMPORAL CHARACTERISTIC AND HYPERGRAPH DATA QUERY METHOD AND APPARATUS WITH TEMPORAL CHARACTERISTIC

(71) Applicant: Alipay (Hangzhou) Information Technology Co., Ltd., Hangzhou (CN)

(72) Inventor: Da Zhang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/941,091

(22) Filed: Nov. 8, 2024

(65) Prior Publication Data

US 2025/0156374 A1 May 15, 2025

(30) Foreign Application Priority Data

Nov. 9, 2023 (CN) .......................... 202311499817.3

(51) Int. Cl.
*G06F 16/13* (2019.01)
*G06F 16/14* (2019.01)

(52) U.S. Cl.
CPC ............ *G06F 16/13* (2019.01); *G06F 16/148* (2019.01)

(58) Field of Classification Search
CPC ................................ G06F 16/13; G06F 16/148

USPC ........................................................ 707/821
See application file for complete search history.

(56) References Cited

U.S. PATENT DOCUMENTS

| | | | | |
|---|---|---|---|---|
| 2013/0091266 A1* | 4/2013 | Bhave | ..................... | H04L 43/14 |
| | | | | 709/224 |
| 2023/0334093 A1* | 10/2023 | Garduno Hernandez | .................. | |
| | | | | G06F 16/9024 |
| 2024/0004841 A1* | 1/2024 | Niu | ......................... | G06F 16/13 |

* cited by examiner

*Primary Examiner* — Robert W Beausoliel, Jr.
*Assistant Examiner* — Lauren Zannah Ganger
(74) *Attorney, Agent, or Firm* — Womble Bond Dickinson (US) LLP

(57) ABSTRACT

Embodiments of this specification relate to a hypergraph data storage method and apparatus with a temporal characteristic and a hypergraph data query method and apparatus with a temporal characteristic. The storage method includes: obtaining raw edge data of a first hyperedge; storing first target data of the N nodes in a second storage table in a first file, and determining first storage location information of the N nodes in the second storage table; forming first hyperedge data based on the first number and the first storage location information, and storing the first hyperedge data in a first storage table in the first file; and storing the first file in a first file directory in a file system based on the first time, where the first file directory corresponds to a first time window, and the first time falls within the first time window.

19 Claims, 12 Drawing Sheets

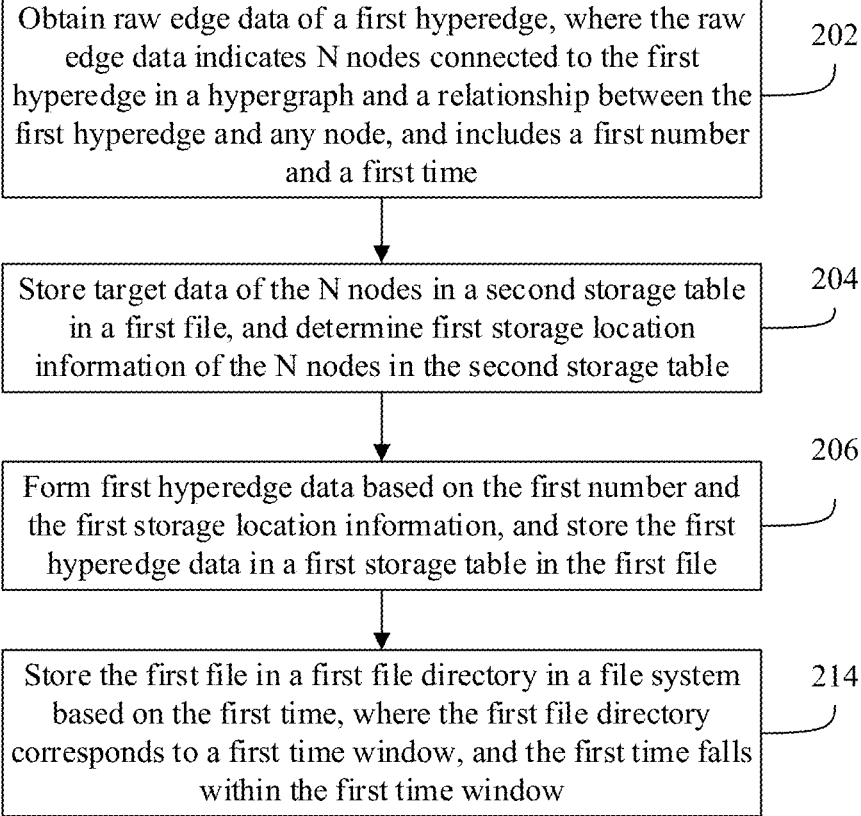

Obtain raw edge data of a first hyperedge, where the raw edge data indicates N nodes connected to the first hyperedge in a hypergraph and a relationship between the first hyperedge and any node, and includes a first number and a first time          202

Store target data of the N nodes in a second storage table in a first file, and determine first storage location information of the N nodes in the second storage table          204

Form first hyperedge data based on the first number and the first storage location information, and store the first hyperedge data in a first storage table in the first file          206

Store the first file in a first file directory in a file system based on the first time, where the first file directory corresponds to a first time window, and the first time falls within the first time window          214

FIG. 2

Hypergraph file (KGFile)

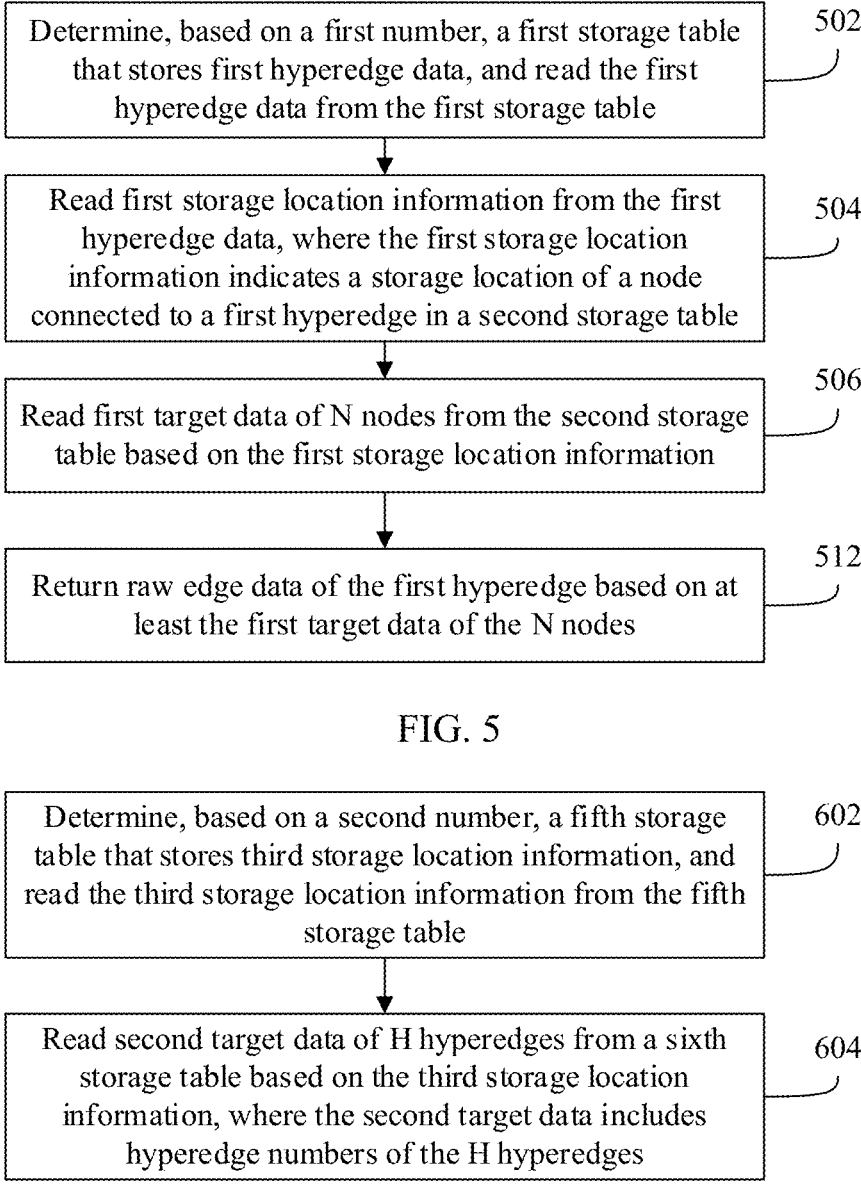

Determine, based on a first number, a first storage table that stores first hyperedge data, and read the first hyperedge data from the first storage table    502

Read first storage location information from the first hyperedge data, where the first storage location information indicates a storage location of a node connected to a first hyperedge in a second storage table    504

Read first target data of N nodes from the second storage table based on the first storage location information    506

Return raw edge data of the first hyperedge based on at least the first target data of the N nodes    512

FIG. 5

Determine, based on a second number, a fifth storage table that stores third storage location information, and read the third storage location information from the fifth storage table    602

Read second target data of H hyperedges from a sixth storage table based on the third storage location information, where the second target data includes hyperedge numbers of the H hyperedges    604

FIG. 6

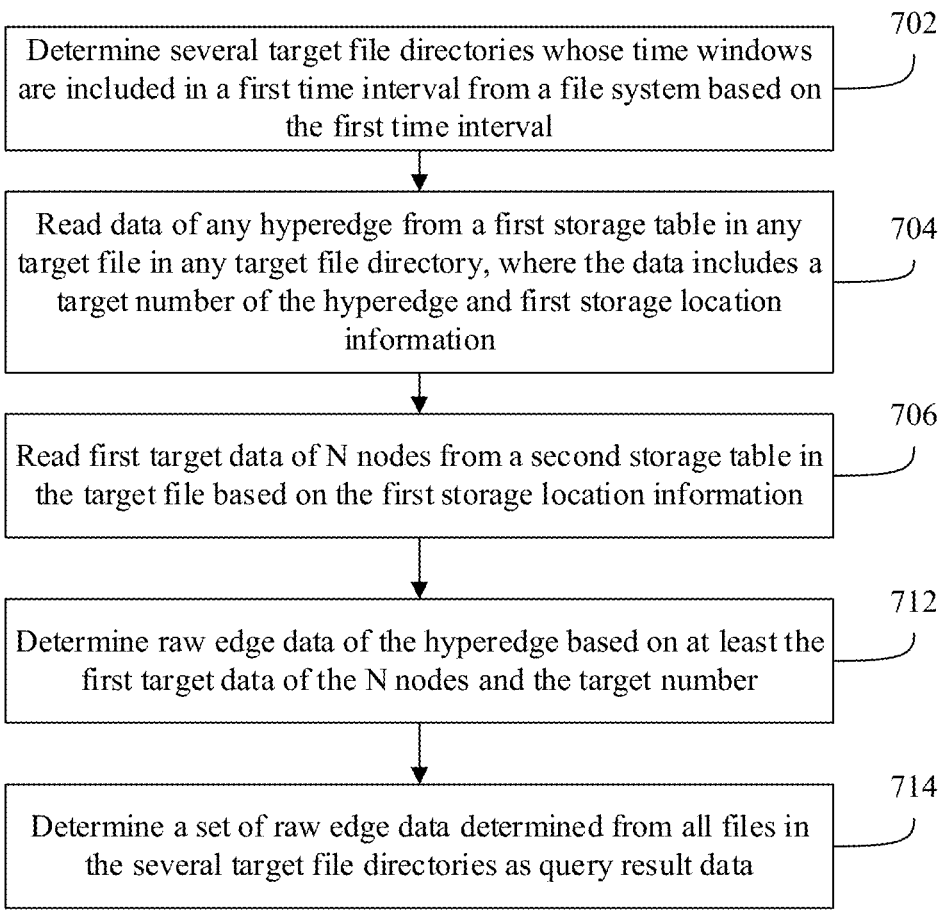

Determine several target file directories whose time windows are included in a first time interval from a file system based on the first time interval    702

Read data of any hyperedge from a first storage table in any target file in any target file directory, where the data includes a target number of the hyperedge and first storage location information    704

Read first target data of N nodes from a second storage table in the target file based on the first storage location information    706

Determine raw edge data of the hyperedge based on at least the first target data of the N nodes and the target number    712

Determine a set of raw edge data determined from all files in the several target file directories as query result data    714

FIG. 7

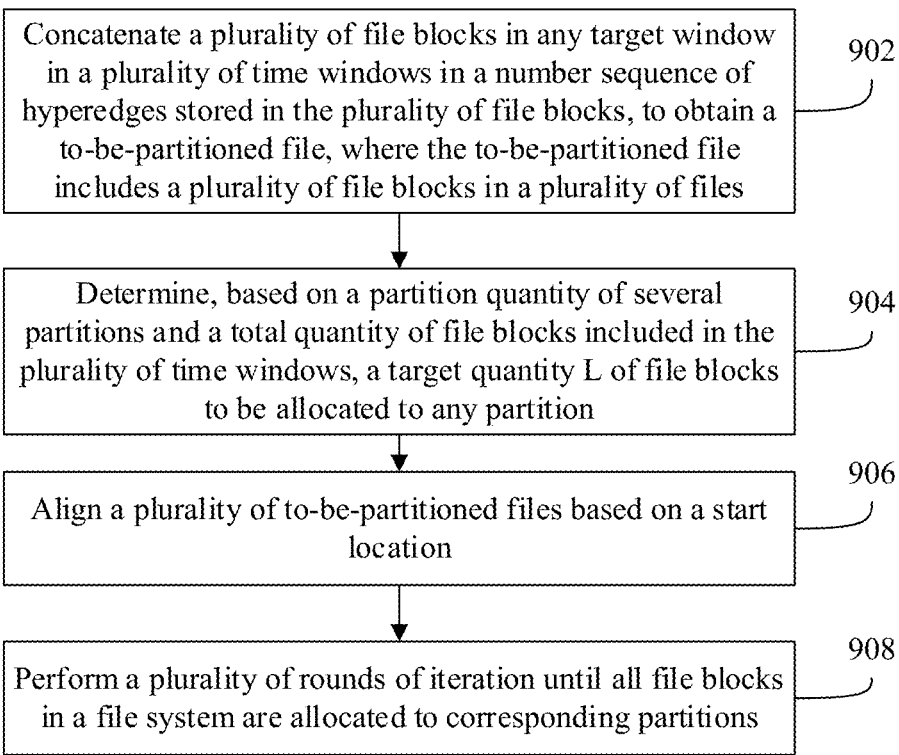

Concatenate a plurality of file blocks in any target window in a plurality of time windows in a number sequence of hyperedges stored in the plurality of file blocks, to obtain a to-be-partitioned file, where the to-be-partitioned file includes a plurality of file blocks in a plurality of files

902

Determine, based on a partition quantity of several partitions and a total quantity of file blocks included in the plurality of time windows, a target quantity L of file blocks to be allocated to any partition

904

Align a plurality of to-be-partitioned files based on a start location

906

Perform a plurality of rounds of iteration until all file blocks in a file system are allocated to corresponding partitions

HYPERGRAPH DATA STORAGE METHOD AND APPARATUS WITH TEMPORAL CHARACTERISTIC AND HYPERGRAPH DATA QUERY METHOD AND APPARATUS WITH TEMPORAL CHARACTERISTIC

CROSS-REFERENCE TO RELATED APPLICATIONS

This application claims priority to Chinese Patent Application No. 202311499817.3, filed with the China National Intellectual Property Administration on Nov. 9, 2023, which is incorporated here by reference in its entirety.

TECHNICAL FIELD

One or more embodiments of this specification relate to the field of graph data processing, and in particular, to a hypergraph data storage method and apparatus with a temporal characteristic and a hypergraph data query method and apparatus with a temporal characteristic.

BACKGROUND

In recent years, knowledge graphs have been widely used in various scenarios. In knowledge modeling scenarios of insurance, payment, and other services, an event usually has elements such as an occurrence time, space, an acting subject, and an object, and these elements correspond to nodes in the knowledge graph. Therefore, an event simultaneously corresponds to a plurality of nodes in the knowledge graph.

Existing knowledge repositories have no flexible and effective modeling manner for data such as events, are incapable of storing time series, and have limited temporal analysis and event reasoning capabilities. Therefore, more effective event data storage and query methods need to be designed.

SUMMARY

One or more embodiments of this specification describe a hypergraph data storage method and apparatus with a temporal characteristic and a hypergraph data query method and apparatus with a temporal characteristic. An event corresponding to a plurality of element nodes is converted into a hyperedge for storage and query. The hyperedge is an edge connected to any quantity of nodes, and a graph including the hyperedge is referred to as a hypergraph.

According to a first aspect, a hypergraph data storage method with a temporal characteristic is provided. A hypergraph includes a node and a hyperedge, and the hyperedge is an edge connected to any quantity of nodes. The method includes:

obtaining raw edge data of a first hyperedge, where the raw edge data indicates N nodes connected to the first hyperedge in the hypergraph and a relationship between the first hyperedge and any node, and includes a first number and a first time;

storing first target data of the N nodes in a second storage table in a first file, and determining first storage location information of the N nodes in the second storage table, where the first target data includes a number of the node and a relationship between the first hyperedge and the node;

forming first hyperedge data based on the first number and the first storage location information, and storing the first hyperedge data in a first storage table in the first file; and storing the first file in a first file directory in a file system based on the first time, where the first file directory corresponds to a first time window, and the first time falls within the first time window.

In a possible implementation, the determining first storage location information of the N nodes in the second storage table includes:

determining a first start location of the N nodes in the second storage table;

determining a first total length of the N nodes in the second storage table based on a value of N and a preset first target data length of a single node; and determining the first start location and the first total length as the first storage location information.

In a possible implementation, the raw edge data of the first hyperedge further includes M properties; and the method further includes:

storing data of the M properties in a third storage table in the first file, and determining second storage location information of the M properties in the third storage table; and storing the second storage location information in the first hyperedge data in the first storage table.

In a possible implementation, the first file further includes a first file block; and the first storage table, the second storage table, and the third storage table are located in the first file block.

In a possible implementation, the first file block further includes a fourth storage table; and the method further includes:

determining a start location and a length of each of the first storage table, the second storage table, and the third storage table in the first file block, and storing the start location and the length in the fourth storage table.

In a possible implementation, the first storage table includes a plurality of pieces of hyperedge data and a plurality of corresponding numbers, and the plurality of pieces of hyperedge data are sorted in the first storage table in a sequence of the corresponding numbers.

In a possible implementation, the first file directory further includes a Bloom filter, and the Bloom filter is configured to determine whether any target hyperedge is stored in any file in the first file directory.

In a possible implementation, the first file directory is further provided with a time to live TTL, and the time to live is used to set all files in the first file directory to a nonqueryable state upon expiration.

In a possible implementation, the method further includes:

determining H hyperedges connected to a first node;

storing second target data of the H hyperedges in a sixth storage table in a second file, and determining third storage location information of the H hyperedges in the sixth storage table, where the second target data includes a number of the hyperedge and a relationship between the hyperedge and the first node; and associatively storing a number of the first node and the third storage location information in a fifth storage table in the second file.

In a possible implementation, the second file further includes a second file block; and the fifth storage table and the sixth storage table are located in the second file block.

In a possible implementation, the second file block further includes a seventh storage table; and the method further includes:

determining a start location and a length of each of the fifth storage table and the sixth storage table in the second file block, and storing the start location and the length in the seventh storage table.

According to a second aspect, a hypergraph data query method is provided. A hypergraph includes a node and a hyperedge, and the hyperedge is an edge connected to any quantity of nodes. The method is used to query a corresponding first hyperedge from a plurality of file directories in a file system based on a first number, and includes:

determining, based on the first number, a first storage table that stores first hyperedge data, and reading the first hyperedge data from the first storage table, where the first storage table is located in a first file, the first file is located in a first file directory, the first file further includes a second storage table that stores first target data of a node, and the first target data includes a number of the node and a relationship between the first hyperedge and the node;

reading first storage location information from the first hyperedge data, where the first storage location information indicates a storage location of a node connected to the first hyperedge in the second storage table;

reading first target data of N nodes from the second storage table based on the first storage location information; and returning raw edge data of the first hyperedge based on at least the first target data of the N nodes.

In a possible implementation, the first storage location information includes a first start location and a first total length, the first start location indicates a start location of a plurality of nodes connected to the first hyperedge in the second storage table, and the first total length indicates a total length of first target data of the plurality of nodes; and the reading first target data of N nodes from the second storage table based on the first storage location information includes:

determining, based on the first start location, the first total length, and a preset first target data length of a single node, a quantity N of the plurality of nodes connected to the first hyperedge and respective locations of the plurality of nodes in the second storage table, and reading the first target data of the N nodes from the second storage table.

In a possible implementation, the first hyperedge further includes a plurality of properties, and the first file further includes a third storage table that stores property data; and the method further includes:

reading second storage location information from the first hyperedge data, where the second storage location information indicates a storage location of a property of the first hyperedge in the third storage table; and reading property data of M properties from the third storage table based on the second storage location information; and the returning raw edge data of the first hyperedge based on at least the first target data of the N nodes includes:

returning the raw edge data of the first hyperedge based on the first target data of the N nodes and the property data of the M properties.

In a possible implementation, the plurality of file directories in the file system further include Bloom filters, and the Bloom filter is configured to determine whether any target hyperedge is stored in any file in a target file directory; and the determining, based on the first number, a first storage table that stores first hyperedge data includes:

separately inputting the first number to the Bloom filters in the plurality of file directories, and determining, based on output results of the Bloom filters, a plurality of candidate file directories that may include the first hyperedge data; and separately searching the plurality of candidate file directories based on the first number, to determine the first storage table that stores the first hyperedge data.

According to a third aspect, a hypergraph data query method is provided. A hypergraph includes a node and a hyperedge, and the hyperedge is an edge connected to any quantity of nodes. The method is used to query all hyperedges connected to a second node from a plurality of file directories in a file system based on a second number of the second node, and includes:

determining, based on the second number, a fifth storage table that stores third storage location information, and reading the third storage location information from the fifth storage table, where the fifth storage table is located in a second file, the second file further includes a sixth storage table that stores second target data of a hyperedge, the third storage location information indicates a storage location of a hyperedge connected to the second node in the sixth storage table, and the second target data includes a number of the hyperedge and a relationship between the hyperedge and the first node; and reading second target data of H hyperedges from the sixth storage table based on the third storage location information, where the second target data includes hyperedge numbers of the H hyperedges.

In a possible implementation, the third storage location information includes a third start location and a third total length, the third start location indicates a start location of a plurality of hyperedges connected to the second node in the sixth storage table, and the third total length indicates a total length of second target data of the plurality of hyperedges; and the reading second target data of H hyperedges from the sixth storage table based on the third storage location information includes:

determining, based on the third start location, the third total length, and a preset second target data length of a single hyperedge, a quantity H of the plurality of hyperedges connected to the second node and respective locations of the plurality of hyperedges in the sixth storage table, and reading the second target data of the H hyperedges from the sixth storage table.

According to a fourth aspect, a hypergraph data query method with a temporal characteristic is provided. A hypergraph includes a node and a hyperedge, and the hyperedge is an edge connected to any quantity of nodes. The method is used to query a plurality of corresponding hyperedges from a file system based on a first time interval, each file directory in the file system has a corresponding time window, and the method includes:

determining several target file directories whose time windows are included in the first time interval from the file system based on the first time interval;

reading data of any first hyperedge from a first storage table in any target file in any target file directory, where the data includes a target number of the hyperedge and first storage location information, and the first storage location information indicates a storage location of a node connected to the hyperedge in a second storage table;

reading first target data of N nodes from the second storage table in the target file based on the first storage location information, where the first target data includes a number of the node and a relationship between the first hyperedge and the node;

determining raw edge data of the hyperedge based on at least the first target data of the N nodes and the target number; and determining a set of raw edge data determined from all files in the several target file directories as query result data.

In a possible implementation, the first storage location information includes a first start location and a first total length, the first start location indicates a start location of a plurality of nodes connected to the first hyperedge in the second storage table, and the first total length indicates a total length of first target data of the plurality of nodes; and the reading first target data of N nodes from the second storage table in the target file based on the first storage location information includes:

determining, based on the first start location, the first total length, and a preset first target data length of a single node, a quantity N of the plurality of nodes connected to the hyperedge and respective locations of the plurality of nodes in the second storage table, and reading the first target data of the N nodes from the second storage table in the target file.

In a possible implementation, the hyperedge further includes a plurality of properties, and the target file further includes a third storage table that stores property data; and the method further includes:

reading second storage location information from the hyperedge data of the hyperedge, where the second storage location information indicates a storage location of a property of the hyperedge in the third storage table; and reading property data of M properties from the third storage table based on the second storage location information; and the determining raw edge data of the hyperedge based on at least the first target data of the N nodes and the target number includes:

determining the raw edge data of the hyperedge based on at least the first target data of the N nodes, the property data of the M properties, and the target number.

In a possible implementation, each of the plurality of file directories is further provided with a time to live TTL, and the time to live is used to set all files in the corresponding file directory to a non-queryable state upon expiration; and the determining several target file directories whose time windows are included in the first time interval from the file system based on the first time interval includes:

determining several target file directories whose time windows are included in the first time interval and states are a queryable state from the file system based on the first time interval.

According to a fifth aspect, a hypergraph data partitioning method with a timing characteristics is provided, and is used to divide hypergraph data stored in a file system according to the method according to the first aspect into a plurality of partitions. The file system includes a plurality of time windows, any file further includes a plurality of file blocks, and a plurality of hyperedges in any file block are stored in a number sequence in an ordered manner. The method includes:

concatenating a plurality of file blocks in any target window in the plurality of time windows in a number sequence of hyperedges stored in the plurality of file blocks, to obtain a to-be-partitioned file, where the to-be-partitioned file includes a plurality of file blocks in a plurality of files;

determining, based on a partition quantity of the several partitions and a total quantity of file blocks included in the plurality of time windows, a target quantity L of file blocks to be allocated to any partition;

aligning a plurality of to-be-partitioned files based on a start location; and performing a plurality of rounds of iteration until all file blocks in the file system are allocated to corresponding partitions, where any round of iteration includes:

determining a first target file block from current unpartitioned file blocks, so that start locations of at least L file blocks in the current unpartitioned file blocks are before an end location of the first target file block; and allocating the at least L file blocks to a same partition, and marking the at least L file blocks as "partitioned".

In a possible implementation, the determining a target quantity L of file blocks to be allocated to any partition includes:

determining a value obtained by rounding up a quotient obtained by dividing the total quantity of file blocks by the partition quantity as the target quantity L.

In a possible implementation, the determining a first target file block from current unpartitioned file blocks includes:

determining a first candidate file block with an end location at a highest ranking from the current unpartitioned file blocks; and performing a plurality of rounds of iteration until a current cumulative quantity of file blocks is greater than or equal to L, where any round of iteration includes:

counting a quantity of file blocks whose start locations are before the end location of the first candidate file block in the unpartitioned file blocks, and recording the quantity in the current cumulative quantity; and if the current cumulative quantity is greater than or equal to L, determining the first candidate file block as the first target file block; or if the current cumulative quantity is less than L, determining a file block with an end location at a highest ranking as a new first candidate file block from remaining unpartitioned file blocks.

According to a sixth aspect, a hypergraph data storage apparatus with a temporal characteristic is provided. A hypergraph includes a node and a hyperedge, and the hyperedge is an edge connected to any quantity of nodes. The apparatus includes:

an obtaining unit, configured to obtain raw edge data of a first hyperedge, where the raw edge data indicates N nodes connected to the first hyperedge in the hypergraph and a relationship between the first hyperedge and any node, and includes a first number and a first time;

a first storage unit, configured to: store first target data of the N nodes in a second storage table in a first file, and determine first storage location information of the N nodes in the second storage table, where the first target data includes a number of the node and a relationship between the first hyperedge and the node;

a second storage unit, configured to: form first hyperedge data based on the first number and the first storage location information, and store the first hyperedge data in a first storage table in the first file; and a third storage unit, configured to store the first file in a first file directory in a file system based on the first time, where the first file directory corresponds to a first time window, and the first time falls within the first time window.

According to a seventh aspect, a hypergraph data query apparatus is provided. A hypergraph includes a node and a hyperedge, and the hyperedge is an edge connected to any quantity of nodes. The apparatus is configured to query a corresponding first hyperedge from a plurality of file directories in a file system based on a first number, and includes:

a determining unit, configured to: determine, based on the first number, a first storage table that stores first hyperedge data, and read the first hyperedge data from the first storage table, where the first storage table is located in a first file, the first file is located in a first file directory, the first file further includes a second storage table that stores first target data of a node, and the first target data includes a number of the node and a relationship between the first hyperedge and the node;

a first reading unit, configured to read first storage location information from the first hyperedge data, where the first storage location information indicates a storage location of a node connected to the first hyperedge in the second storage table;

a second reading unit, configured to read first target data of N nodes from the second storage table based on the first storage location information; and a data return unit, configured to return raw edge data of the first hyperedge based on at least the first target data of the N nodes.

According to an eighth aspect, a hypergraph data query apparatus is provided. A hypergraph includes a node and a hyperedge, and the hyperedge is an edge connected to any quantity of nodes. The apparatus is configured to query all hyperedges connected to a second node from a plurality of file directories in a file system based on a second number of the second node, and includes:

a determining unit, configured to: determine, based on the second number, a fifth storage table that stores third storage location information, and read the third storage location information from the fifth storage table, where the fifth storage table is located in a second file, the second file further includes a sixth storage table that stores second target data of a hyperedge, the third storage location information indicates a storage location of a hyperedge connected to the second node in the sixth storage table, and the second target data includes a number of the hyperedge and a relationship between the hyperedge and the first node; and a reading unit, configured to read second target data of H hyperedges from the sixth storage table based on the third storage location information, where the second target data includes hyperedge numbers of the H hyperedges.

According to a ninth aspect, a hypergraph data query apparatus with a temporal characteristic is provided. A hypergraph includes a node and a hyperedge, and the hyperedge is an edge connected to any quantity of nodes. The apparatus is configured to query a plurality of corresponding hyperedges from a file system based on a first time interval, each file directory in the file system has a corresponding time window, and the apparatus includes:

a first determining unit, configured to determine several target file directories whose time windows are included in the first time interval from the file system based on the first time interval;

a first reading unit, configured to read data of any hyperedge from a first storage table in any target file in any target file directory, where the data includes a target number of the hyperedge and first storage location information, and the first storage location information indicates a storage location of a node connected to the hyperedge in a second storage table;

a second reading unit, configured to read first target data of N nodes from the second storage table in the target file based on the first storage location information, where the first target data includes a number of the node and a relationship between the first hyperedge and the node;

a second determining unit, configured to determine raw edge data of the hyperedge based on at least the first target data of the N nodes and the target number; and a third determining unit, configured to determine a set of raw edge data determined from all files in the several target file directories as query result data.

According to a tenth aspect, a hypergraph data partitioning apparatus with a timing characteristics is provided, and is configured to divide hypergraph data stored in a file system according to the apparatus according to the fifth aspect into a plurality of partitions. The file system includes a plurality of time windows, any file further includes a plurality of file blocks, and a plurality of hyperedges in any file block are stored in a number sequence in an ordered manner. The apparatus includes:

a concatenation unit, configured to concatenate a plurality of file blocks in any target window in the plurality of time windows in a number sequence of hyperedges stored in the plurality of file blocks, to obtain a to-be-partitioned file, where the to-be-partitioned file includes a plurality of file blocks in a plurality of files;

a determining unit, configured to determine, based on a partition quantity of the several partitions and a total quantity of file blocks included in the plurality of time windows, a target quantity L of file blocks to be allocated to any partition;

an alignment unit, configured to align a plurality of to-be-partitioned files based on a start location; and a partition allocation unit, configured to perform a plurality of rounds of iteration until all file blocks in the file system are allocated to corresponding partitions, where any round of iteration includes:

determining a first target file block from current unpartitioned file blocks, so that start locations of at least L file blocks in the current unpartitioned file blocks are before an end location of the first target file block; and allocating the at least L file blocks to a same partition, and marking the at least L file blocks as "partitioned".

According to an eleventh aspect, a computer-readable storage medium is provided. The computer-readable storage medium stores a computer program. When the computer program is executed in a computer, the computer is enabled to perform the method according to the first aspect to the fourth aspect.

According to a twelfth aspect, a computing device is provided, and includes a memory and a processor. The memory stores executable code. When the processor executes the executable code, the method according to the first aspect to the fourth aspect is implemented.

According to the hypergraph data storage method and apparatus with a temporal characteristic and the hypergraph data query method and apparatus with a temporal characteristic that are provided in the embodiments of this specification, the method can store and query a hypergraph. In addition, a time window is introduced, so that there is a temporal characteristic between windows, to meet a temporal access requirement of a hyperedge and improve temporal analysis and event reasoning capabilities.

BRIEF DESCRIPTION OF DRAWINGS

To describe the technical solutions in the plurality of embodiments disclosed in this specification more clearly, the following briefly describes the accompanying drawings needed for describing the embodiments. Clearly, the accompanying drawings in the following descriptions show merely the plurality of embodiments disclosed in this specification, and a person of ordinary skill in the art can still derive other drawings from these accompanying drawings without creative efforts.

FIG. 2 is a flowchart of a hypergraph data storage method with a temporal characteristic according to an embodiment;

FIG. 5 is a flowchart of a hypergraph data query method according to an embodiment;

FIG. 6 is a flowchart of a hypergraph data query method according to another embodiment;

FIG. 7 is a flowchart of a hypergraph data query method with a temporal characteristic according to an embodiment;

FIG. 9 is a flowchart of a hypergraph data partitioning method with a temporal characteristic according to an embodiment;

DESCRIPTION OF EMBODIMENTS

The solutions provided in this specification are described below with reference to the accompanying drawings.

A hypergraph is a graph in a broad sense. Different from one edge, in an ordinary graph, that can be connected only to two nodes, one edge in a hypergraph can be connected to any quantity of nodes. An edge connected to any quantity of nodes is referred to as a hyperedge. In a conventional graph, there is usually a one-to-one relationship between two nodes. However, in the hypergraph, the hyperedge can be used to be connected to a plurality of nodes, so that a relationship between a plurality of nodes can be represented.

Compared with the conventional graph, the hypergraph can be used to perform modeling for more extensive application scenarios. For example, in a graph corresponding to a consumption scenario, a user, a store, an item in the store, and an area of interest in which the store is located can be modeled as nodes. For example, if there is a user node User1, a store node Store1, an item node Item1, and an area of interest node AOI1 in the graph, an event in which the user User1 purchases the item Item1 in the store Store1 in the area of interest AOI1 can be directly represented by a hyperedge Hyperedge1 connected to the above-mentioned four nodes. This cannot implemented in a conventional graph. In addition, the hyperedge can further have a relationship with any node. In the above-mentioned example, a relationship between the user purchase event corresponding to the hyperedge Hyperedge1 and the user node User1 can be an "execution subject", a relationship with the store node Store1 can be "located", and a relationship with the item node Item1 can be "purchase". In this scenario, the hyperedge can be considered as a virtual node, and a relationship between the virtual node of the hyperedge and a real node connected to the hyperedge can form a subject-predicate-object (SPO) triplet, that is, (virtual node, relationship, real node), in a general sense.

In addition, the user purchase event further has an occurrence time. Therefore, the hyperedge can further have a corresponding time property value, which can indicate a time at which the hyperedge is generated. Further, the hyperedge can further have a plurality of properties. In the above-mentioned example, the user purchase event corresponding to the hyperedge Hyperedge1 can have labels such as "small transaction" and "shopping in an area of interest that is not frequently visited", and these labels can be modeled as a plurality of properties corresponding to the hyperedge.

It is difficult to store and query the hyperedge in the hypergraph by using a conventional solution, and the hyperedge further has a time property and a temporal access requirement, which are difficult to implement by using an existing solution.

Figure 1:
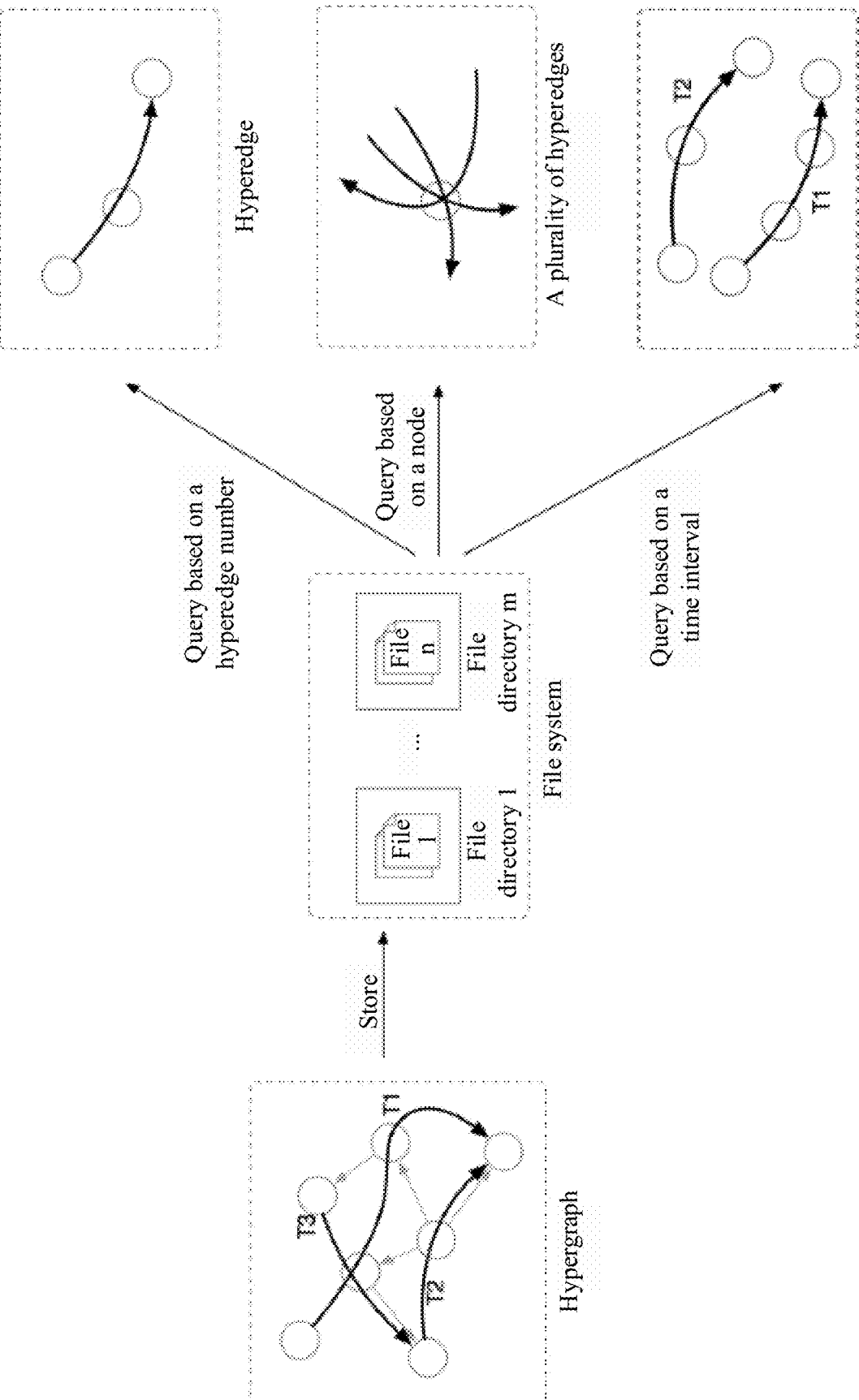
FIG. 1 is a schematic diagram of an implementation scenario of a hypergraph data storage method with a temporal characteristic and a hypergraph data query method with a temporal characteristic according to an embodiment.

FIG. 1 is a schematic diagram of an implementation scenario of a hypergraph data storage method with a temporal characteristic and a hypergraph data query method with a temporal characteristic according to an embodiment. In the example in FIG. 1, a file system used to store a hypergraph includes a plurality of file directories, and each file directory corresponds to a time window. The time window can be any time granularity, for example, 1 day, 1 hour, and 1 minute. In an embodiment, when the time granularity is 1 day, a file directory 1 can correspond to a first day, a file directory 2 can correspond to a second day, and so on. A plurality of files are stored in any file directory, and any file is used to store a hyperedge whose time property value falls within a time window corresponding to the current file directory. For example, the file directory 1 can store all hyperedges whose time property values fall within the first day.

When a hyperedge in a hypergraph is stored in the file system, because any hyperedge includes at least a hyperedge number and a time property value, a file directory of a corresponding time window is first found based on the time property value of the hyperedge, and then the hyperedge is stored in a file in the corresponding file directory. A plurality of hyperedges in a single file are stored in a sequence of numbers, to implement binary search. After the hypergraph is stored in the file system, a hyperedge can be queried from the file system based on a hyperedge number, or all hyperedges connected to a specific node can be queried, or all hyperedges whose time property values fall within a time interval can be queried in batches based on the time interval.

For example, in the example shown in FIG. 1, there are at least three hyperedges in the original hypergraph, and the hyperedges respectively correspond to time property values: T1, T2, and T3, where T1<T2<T3. It can be understood that there can be another hyperedge and node in the hypergraph, but the hyperedge and the node are not shown in the figure. When query is performed based on a hyperedge number, a query result is a hyperedge corresponding to the hyperedge number. When all hyperedges connected to a specific node are queried based on a node, a query result is a plurality of hyperedges, and all of the hyperedges are connected to the node. When all hyperedges whose time property values fall within a time interval are queried based on the time interval, for example, when the time interval ranges from T1 to T2, a query result includes at least two edges whose time property values are T1 and T2, and a hyperedge whose time property value T3 falls outside the time interval is not present in the query result.

Specific implementation steps for storing and querying a hyperedge are described in detail in subsequent procedures.

Specific implementation steps of the above-mentioned distributed knowledge graph sharding method are described below with reference to specific embodiments. FIG. 2 is a flowchart of a hypergraph data storage method with a temporal characteristic according to an embodiment. A hypergraph includes a node and a hyperedge, and the hyperedge is an edge connected to any quantity of nodes. The method can be performed by any platform, server, device cluster, etc. with a computing and processing capability. As shown in FIG. 2, the method includes at least the following steps: Step 202: Obtain raw edge data of a first hyperedge, where the raw edge data indicates N nodes connected to the first hyperedge in the hypergraph and a relationship between the first hyperedge and any node, and includes a first number and a first time; step 204: Store first target data of the N nodes in a second storage table in a first file, and determine first storage location information of the N nodes in the second storage table, where the first target data includes a number of the node and a relationship between the first hyperedge and the node; step 206: Form first hyperedge data based on the first number and the first storage location information, and store the first hyperedge data in a first storage table in the first file; and step 214: Store the first file in a first file directory in a file system based on the first time, where the first file directory corresponds to a first time window, and the first time falls within the first time window. A specific execution process of the above-mentioned steps is described below.

First, in step 202, the raw edge data of the first hyperedge is obtained, where the raw edge data indicates the N nodes connected to the first hyperedge in the hypergraph and the relationship between the first hyperedge and the any node, and includes the first number and the first time.

The raw edge data is raw and unprocessed unstructured data obtained when the hyperedge is generated. If the raw edge data is directly stored in the file system, it is difficult to query the raw edge data. Therefore, the raw edge data needs to be converted into structured data based on subsequent steps for storage. The first number can be a number that is generated when the hyperedge is generated and that uniquely corresponds to the hyperedge. The first time can be a time at which the hyperedge is generated, and is a time property value of the hyperedge. For example, when the hyperedge corresponds to an event, the first time can be a time at which the event occurs.

In step 204, the first target data of the N nodes is stored in the second storage table in the first file, and the first storage location information of the N nodes in the second storage table is determined.

The first target data of the node includes the number of the node and the relationship between the first hyperedge and the node.

Figure 3:
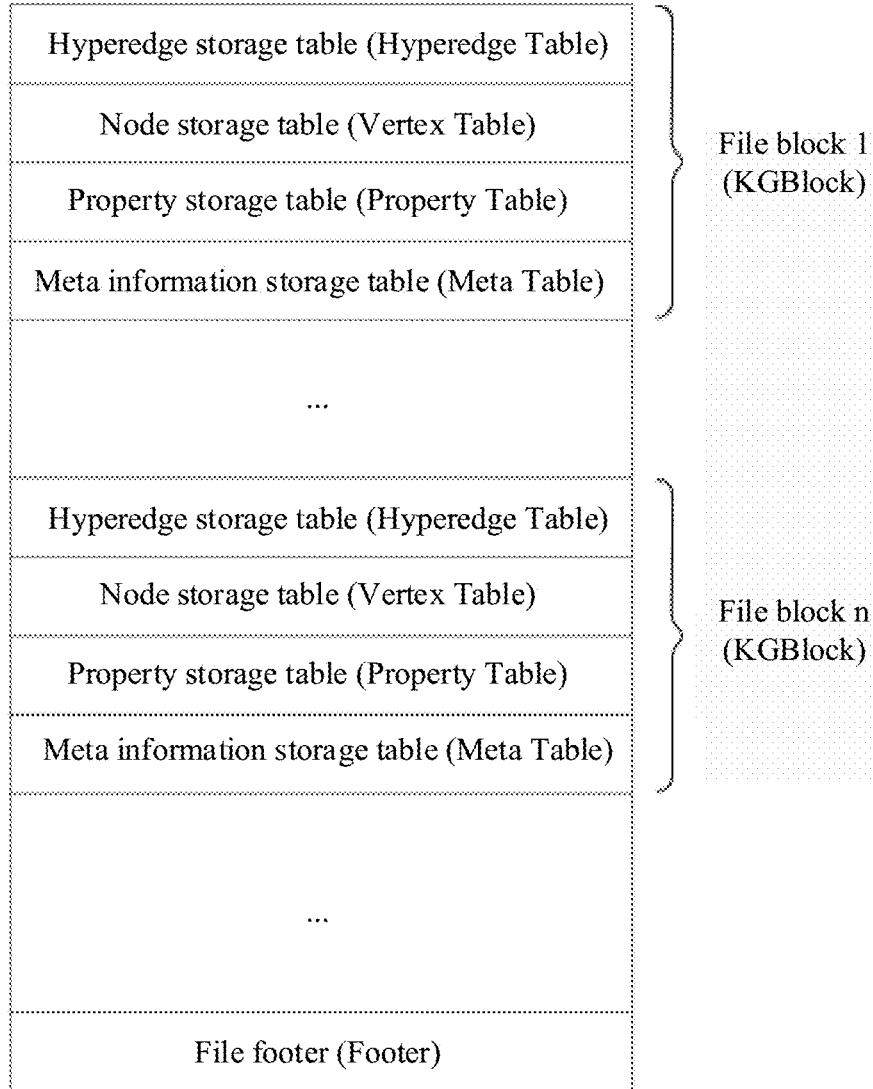
FIG. 3 is a schematic diagram of a data structure of a hypergraph file that stores a hyperedge according to an embodiment.

The first file can be a hypergraph file. A schematic diagram of a data structure of the hypergraph file can be shown in FIG. 3. As shown in FIG. 3, the hypergraph file (KGFile) includes a plurality of file blocks (KGBlock), where KG represents Knowledge Graph. The plurality of file blocks are of a same structure, and any file block includes a plurality of storage tables, including: a hyperedge storage table (Hyperedge Table), used to store basic data of a hyperedge; a node storage table (Vertex Table), used to store first target data of a node connected to the hyperedge, that is, a number of the node and a relationship between the hyperedge and the node; a property storage table (Property Table), used to store property data of a property of the hyperedge, where it should be noted that if some hyperedges do not have property data, no data is correspondingly stored in the property storage table when such hyperedges are stored; and a meta information storage table (Meta Table), used to store information about the above-mentioned three storage tables. The first file further includes a file footer, used to store some auxiliary data that describes a property of the file.

In step 204, the second storage table can be a node storage table, and the first storage location information is used to record storage locations of the N nodes in the node storage table.

In an embodiment, the determining first storage location information includes: determining a first start location (offset) of the N nodes in the second storage table; determining a first total length of the N nodes in the second storage table based on a value of N and a preset first target data length of a single node; and determining the first start location and the first total length as the first storage location information.

The N nodes are sequentially stored in the node storage table, and the first target data length of a single node is a preset fixed value. Therefore, the storage locations of the N nodes in the node storage table can be located based on the start location of the N nodes in the node storage table and the total data length of the N nodes.

In step 206, the first hyperedge data is formed based on the first number and the first storage location information, and the first hyperedge data is stored in the first storage table in the first file.

The first storage table can be a hyperedge storage table. The hyperedge storage table stores only a number of a hyperedge and storage location information, and does not store specific data of a node connected to the hyperedge. Therefore, the hyperedge storage table can be quickly accessed and traversed, to improve subsequent query efficiency.

By performing step 204 and step 206, the first number of the first hyperedge is stored in the first storage table, and the first target data of the node, that is, the number of the node and the relationship between the first hyperedge and the node, is stored in the second storage table. As described above, when the first hyperedge is considered as a virtual node, (virtual node, relationship, node) forms an SPO triplet, where related information of S is stored in the first storage table, and related information of P and O is stored in the second storage table.

In an embodiment, the first storage table includes a plurality of pieces of hyperedge data and a plurality of corresponding numbers, and the plurality of pieces of hyperedge data are sorted in the first storage table in a sequence of the corresponding numbers.

After the hyperedge data is stored in an ordered manner, binary search can be performed in the file when a hyperedge is subsequently queried based on a number, to improve query efficiency.

In step 214, the first file is stored in the first file directory in the file system based on the first time, where the first file directory corresponds to the first time window, and the first time falls within the first time window.

The file system includes a plurality of file directories, and any file directory corresponds to a different time window. In one embodiment, the file directory can be named by using a time window. In this case, the plurality of file directories in the file system can be organized and sorted by directory name (time window).

A plurality of files can be stored in any file directory, a plurality of hyperedges can be stored in any file, and respective time property values of the hyperedges fall within a time window corresponding to the file directory. For example, if a time window corresponding to a file directory is Mar. 22, 2019, files in which all hyperedges whose time property values fall within Mar. 22, 2019 are located are stored in the file directory.

In an embodiment, a size of the time window corresponding to the file directory can be dynamically changed. When a quantity of files in any file directory exceeds a preset first threshold, the file directory is split into a plurality of file directories, a plurality of files are respectively stored in the plurality of corresponding file directories based on time property values of hyperedges stored in the plurality of files, and a time window size of the file directory obtained through splitting is less than a time window size of the original file directory. The time window size is dynamically changed, so that there is not an excessively large quantity of files in any file directory, to improve subsequent query efficiency.

In an embodiment, the first file directory further includes a Bloom filter, and the Bloom filter is configured to determine whether any target hyperedge is stored in any file in the first file directory. When a number of a hyperedge is input to a Bloom filter in any file directory, if the Bloom filter returns "false", it indicates that the file directory definitely does not include the hyperedge; or if the Boolean filter returns "true", it indicates that the file directory may include the hyperedge, and the file directory needs to be entered for further search.

In an embodiment, the first file directory is further provided with a time to live TTL, and the time to live is used to set all files in the first file directory to a non-queryable state upon expiration. For example, if the TTL is set to 3 days, and the time window of the first file directory is Mar. 22, 2019, all the files in the first file directory are set to the non-queryable state after 3 days, that is, Mar. 25, 2019.

By performing the above-mentioned steps, hyperedges can be stored in the file system in a sequence of hyperedge numbers, to meet a requirement for querying the hyperedge based on a primary key (number). However, after the hyperedges are stored in an ordered manner based on a number, the hyperedges can no longer be directly stored in an ordered manner based on a time. Therefore, in this embodiment of this specification, a time axis is split into a plurality of time windows, a file directory is set based on the time window, and a file in which the hyperedge is located is stored in a corresponding file directory based on a time property value, to implement temporal storage of the hyperedge.

In some possible implementations, the raw edge data of the first hyperedge further includes M properties; and the method further includes step 208 and step 210.

In step 208, data of the M properties is stored in a third storage table in the first file, and second storage location information of the M properties in the third storage table is determined.

The third storage table can be a property storage table, and the second storage location information is used to record storage locations of the M properties in the property storage table.

In an embodiment, the determining second storage location information includes: determining a second start location of the M properties in the third storage table; determining a second total length of the M properties in the third storage table based on a value of M and a preset data length of a single property; and determining the second start location and the second total length as the second storage location information.

The M properties are sequentially stored in the property storage table, and the data length of a single property is a preset fixed value. Therefore, the storage locations of the M properties in the property storage table can be located based on the start location of the M properties in the property storage table and the total data length of the M properties.

In step 210, the second storage location information is stored in the first hyperedge data in the first storage table.

In an embodiment, the first file further includes a first file block; and the first storage table, the second storage table, and the third storage table are located in the first file block.

The first storage table can be a hyperedge storage table, the second storage table can be a node storage table, the third storage table can be a property storage table, and the hyperedge storage table, the node storage table, and the property storage table are located in the first file block.

It should be noted that dividing a file into a plurality of file blocks of a same data structure is merely a data structure added between the file and a storage table to improve query efficiency, and is not required.

In an embodiment, the first file block further includes a fourth storage table; and the method further includes: determining a start location and a length of each of the first storage table, the second storage table, and the third storage table in the first file block, and storing the start location and the length in the fourth storage table.

The fourth storage table can be a meta information storage table, and is used to record storage locations of the hyperedge storage table, the node storage table, and the property storage table in the first file.

In step 202 to step 214, specific implementation steps of storing a hyperedge in the file system are described, and a requirement for finding first target data of a plurality of nodes connected to the hyperedge based on a hyperedge number and a time interval can be met. However, in a hypergraph, any node may be connected to a plurality of hyperedges. If all hyperedges connected to a node need to be queried, for example, for a location node, if all event hyperedges that arrive at the location on a day need to be queried, it is difficult to implement by using only the data structure of the hypergraph file KGFile shown in FIG. 3, and only all hyperedges in the file system can be traversed, resulting in excessively low query efficiency.

Based on this, in some possible implementations, the method further includes step 216 to step 220.

In step 216, H hyperedges connected to a first node are determined.

In step 218, second target data of the H hyperedges is stored in a sixth storage table in a second file, and third storage location information of the H hyperedges in the sixth storage table is determined.

The second target data of the hyperedge includes a number of the hyperedge and a relationship between the hyperedge and the first node.

The second file can be an OPS file (OPSFile), where OPS is an abbreviation of object-predicate-subject, that is, a reverse triplet of a subject-predicate-object (SPO) triplet. A schematic diagram of a data structure of the OPS file can be shown in FIG. 4. Similar to the hypergraph file, the OPS file includes a plurality of file blocks (OPSBlock), the plurality of file blocks are of a same structure, and any file block includes a plurality of storage tables, including: a node storage table (Vertex Table), used to store basic data of any node; a hyperedge storage table (Hyperedge Table), used to store second target data of a hyperedge connected to the node, that is, a number of the hyperedge and a relationship between the hyperedge and the node; and a meta information storage table (Meta Table), used to store information about the above-mentioned two storage tables. Different from the hypergraph file, the OPS file includes no property storage table used to store a property because the node does not have property information. The second file further includes a file footer, used to store some auxiliary data that describes a property of the file.

In step 218, the sixth storage table can be a hyperedge storage table, and the third storage location information is used to record storage locations of the H hyperedges in the hyperedge storage table.

In an embodiment, the determining third storage location information includes: determining a third start location of the H hyperedges in the sixth storage table; determining a third total length of the H hyperedges in the sixth storage table based on a value of H and a preset second target data length of a single hyperedge; and determining the third start location and the third total length as the third storage location information.

In step 220, a number of the first node and the third storage location information are associatively stored in a fifth storage table in the second file.

The fifth storage table can be a node storage table, used to store node information of the first node and the third storage location information.

By performing step 218 and step 220, the number of the first node is stored in the fifth storage table, and the second target data of the hyperedge, that is, the number of the hyperedge and the relationship between the hyperedge and the first node, is stored in the sixth storage table. As described above, when the hyperedge is considered as a virtual node, (virtual node, relationship, first node) forms an SPO triplet, and the SPO triplet is converted into a reverse OPS triplet (first node, relationship, virtual node), where related information of O is stored in the fifth storage table, and related information of P and S is stored in the sixth storage table.

In an embodiment, the second file further includes a second file block; and the fifth storage table and the sixth storage table are located in the second file block.

The fifth storage table can be a node storage table, the sixth storage table can be a hyperedge storage table, and the node storage table and the hyperedge storage table are located in the second file block.

It should be noted that dividing a file into a plurality of file blocks of a same data structure is merely a data structure added between the file and a storage table to improve query efficiency, and is not required.

In an embodiment, the second file block further includes a seventh storage table; and the method further includes: determining a start location and a length of each of the fifth storage table and the sixth storage table in the second file block, and storing the start location and the length in the seventh storage table.

The seventh storage table can be a meta information storage table, and is used to record storage locations of the node storage table and the hyperedge storage table in the second file.

In step 216 to step 220, implementation steps of storing a hyperedge connected to a node in an OPS file are described, and a requirement for querying all hyperedges connected to a node can be met.

Corresponding to the hypergraph data storage method shown in FIG. 2, an embodiment of this specification further provides a hypergraph data query method, which includes three query methods: query based on a hyperedge number, query based on a node, and query based on a time interval.

According to an embodiment in another aspect, a hypergraph data query method is further provided. FIG. 5 is a flowchart of a hypergraph data query method according to an embodiment. A hypergraph includes a node and a hyperedge, and the hyperedge is an edge connected to any quantity of nodes. The method is used to query a corresponding first hyperedge from a plurality of file directories in a file system based on a first number, and includes at least the following steps: Step 502: Determine, based on the first number, a first storage table that stores first hyperedge data, and read the first hyperedge data from the first storage table, where the first storage table is located in a first file, the first file is located in a first file directory, the first file further includes a second storage table that stores first target data of a node, and the first target data includes a number of the node and a relationship between the first hyperedge and the node; step 504: Read first storage location information from the first hyperedge data, where the first storage location information indicates a storage location of a node connected to the first hyperedge in the second storage table; step 506: Read first target data of N nodes from the second storage table based on the first storage location information; and step 512: Return raw edge data of the first hyperedge based on at least the first target data of the N nodes. A specific execution process of the above-mentioned steps is described below.

In step 502, the first storage table that stores the first hyperedge data is determined based on the first number, and the first hyperedge data is read from the first storage table, where the first storage table is located in the first file, the first file is located in the first file directory, the first file further includes the second storage table that stores the first target data of the node, and the first target data includes the number of the node and the relationship between the first hyperedge and the node.

Corresponding to the above-mentioned storage method, the first file can be a hypergraph file shown in FIG. 3, the first storage table can be a hyperedge storage table, and the second storage table can be a node storage table. The first hyperedge data includes the first number and the first storage location information.

There can be a plurality of methods for determining, based on the first number, the first storage table that stores the first hyperedge data. For example, all files in all file directories in the file system can be directly traversed based on the first number. When hyperedges in a file are stored in an ordered manner based on a hyperedge number, a target file that stores a hyperedge can be first located based on a number range of a hyperedge stored in each file, and then binary search can be performed in the target file, to improve query efficiency. This is not limited herein.

In an embodiment, the plurality of file directories in the file system further include Bloom filters. In this case, the determining, based on the first number, a first storage table that stores first hyperedge data includes: separately inputting the first number to the Bloom filters in the plurality of file directories, and determining, based on output results of the Bloom filters, a plurality of candidate file directories that may include the first hyperedge data; and separately searching the plurality of candidate file directories based on the first number, to determine the first storage table that stores the first hyperedge data.

As described above, when a Bloom filter in a file directory returns "false", it indicates that the file directory definitely does not include the hyperedge, and search can be directly skipped; or if a Boolean filter returns "true", it indicates that the file directory may include the hyperedge, and the file directory needs to be entered for further search. In this way, some file directories that definitely do not include the hyperedge can be quickly filtered out, to further improve query efficiency.

Then, in step 504, the first storage location information is read from the first hyperedge data, where the first storage location information indicates the storage location of the node connected to the first hyperedge in the second storage table.

In step 506, the first target data of the N nodes is read from the second storage table based on the first storage location information.

In an embodiment, the first storage location information includes a first start location and a first total length, the first start location indicates a start location of a plurality of nodes connected to the first hyperedge in the second storage table, and the first total length indicates a total length of first target data of the plurality of nodes. Step 506 specifically includes: determining, based on the first start location, the first total length, and a preset first target data length of a single node, a quantity N of the plurality of nodes connected to the first hyperedge and respective locations of the plurality of nodes in the second storage table, and reading the first target data of the N nodes from the second storage table.

A value of N can be obtained based on a quotient obtained by dividing the first total length by the first target data length of a single node. The first target data of the N nodes can be read from the node storage table based on the start location of the N nodes in the node storage table and the value of N.

Then, in step 512, the raw edge data of the first hyperedge is returned based on at least the first target data of the N nodes.

The raw edge data of the first hyperedge can be determined based on the first target data of the N nodes connected to the first hyperedge, that is, respective numbers of the N nodes and a relationship between the first hyperedge and each of the N nodes, and the first number of the hyperedge, to complete query.

In some possible implementations, the first hyperedge further includes a plurality of properties, and the first file further includes a third storage table that stores property data; and the method further includes step 508 and step 510.

In step 508, second storage location information is read from the first hyperedge data, where the second storage location information indicates a storage location of a property of the first hyperedge in the third storage table.

The third storage table can be a property storage table in a hypergraph file.

In step 510, property data of M properties is read from the third storage table based on the second storage location information.

In an embodiment, the second storage location information includes a second start location and a second total length, the second start location indicates a start location of a plurality of properties of the first hyperedge in the third storage table, and the second total length indicates a total data length of the plurality of properties. Step 510 specifically includes: determining, based on the second start location, the second total length, and a preset data length of a single property, a quantity M of the plurality of properties of the first hyperedge and respective locations of the plurality of properties in the third storage table, and reading the property data of the M properties from the third storage table.

A value of M can be obtained based on a quotient obtained by dividing the second total length by the data length of a single property. The property data of the M properties can be read from the property storage table based on the start location of the M properties in the property storage table and the value of M.

When the property data of the M properties is read, step 512 includes: returning the raw edge data of the first hyperedge based on the first target data of the N nodes and the property data of the M properties.

The raw edge data of the first hyperedge can be determined based on the first target data of the N nodes connected to the first hyperedge, that is, the respective numbers of the N nodes and the relationship between the first hyperedge and each of the N nodes, the property data of the M properties owned by the first hyperedge, and the first number of the hyperedge, to complete query.

According to an embodiment in another aspect, a hypergraph data query method is further provided. FIG. 6 is a flowchart of a hypergraph data query method according to another embodiment. A hypergraph includes a node and a hyperedge, and the hyperedge is an edge connected to any quantity of nodes. The method is used to query all hyperedges connected to a second node from a plurality of file directories in a file system based on a second number of the second node, and includes at least the following steps: Step 602: Determine, based on the second number, a fifth storage table that stores third storage location information, and read the third storage location information from the fifth storage table, where the fifth storage table is located in a second file, the second file further includes a sixth storage table that stores second target data of a hyperedge, the third storage location information indicates a storage location of a hyperedge connected to the second node in the sixth storage table, and the second target data includes a number of the hyperedge and a relationship between the hyperedge and the first node; and step 604: Read second target data of H hyperedges from the sixth storage table based on the third storage location information, where the second target data includes hyperedge numbers of the H hyperedges. A specific execution process of the above-mentioned steps is described below.

In step 602, the fifth storage table that stores the third storage location information is determined based on the second number, and the third storage location information is read from the fifth storage table, where the fifth storage table is located in the second file, the second file further includes the sixth storage table that stores the second target data of the hyperedge, the third storage location information indicates the storage location of the hyperedge connected to the second node in the sixth storage table, and the second target data includes the number of the hyperedge and the relationship between the hyperedge and the first node.

Figure 4:
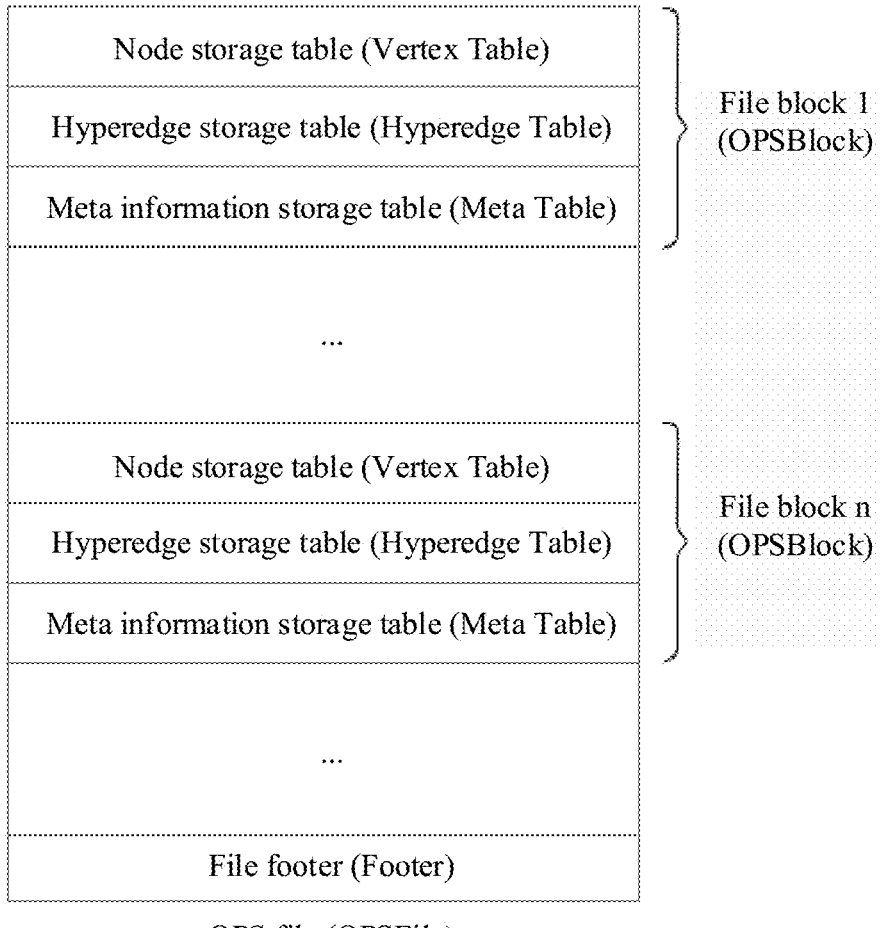
FIG. 4 is a schematic diagram of a data structure of an OPS file that stores a hyperedge connected to a node according to an embodiment.

Corresponding to the above-mentioned storage method, the second file can be a hypergraph file shown in FIG. 4, the fifth storage table can be a node storage table, and the sixth storage table can be a hyperedge storage table.

There can be a plurality of methods for determining, based on the second number, the fifth storage table that stores the third storage location information. For example, all files in all file directories in the file system can be directly traversed based on the second number. When nodes in a file are stored in an ordered manner based on a node number, a target file that stores a node can be first located based on a number range of a node stored in each file, and then binary search can be performed in the target file, to improve query efficiency. This is not limited herein.

In step 604, the second target data of the H hyperedges is read from the sixth storage table based on the third storage location information, where the second target data includes the hyperedge numbers of the H hyperedges.

All the hyperedges connected to the second node can be located based on the hyperedge numbers of the H hyperedges, to complete query.

In an embodiment, the third storage location information includes a third start location and a third total length, the third start location indicates a start location of a plurality of hyperedges connected to the second node in the sixth storage table, and the third total length indicates a total length of second target data of the plurality of hyperedges. Step 604 specifically includes: determining, based on the third start location, the third total length, and a preset second target data length of a single hyperedge, a quantity H of the plurality of hyperedges connected to the second node and respective locations of the plurality of hyperedges in the sixth storage table, and reading the second target data of the H hyperedges from the sixth storage table.

A value of H can be obtained based on a quotient obtained by dividing the third total length by the second target data length of a single hyperedge. The second target data of the H hyperedges can be read from the hyperedge storage table based on the start location of the H hyperedges in the hyperedge storage table and the value of H, where the second target data includes the hyperedge numbers of the H hyperedges. According to an embodiment in another aspect, a hypergraph data query method with a temporal characteristic is further provided. FIG. 7 is a flowchart of a hypergraph data query method with a temporal characteristic according to an embodiment. A hypergraph includes a node and a hyperedge, and the hyperedge is an edge connected to any quantity of nodes. The method is used to query a plurality of corresponding hyperedges from a file system based on a first time interval, each file directory in the file system has a corresponding time window, and the method includes at least the following steps: Step 702: Determine several target file directories whose time windows are included in the first time interval from the file system based on the first time interval; step 704: Read data of any hyperedge from a first storage table in any target file in any target file directory, where the data includes a target number of the hyperedge and first storage location information, and the first storage location information indicates a storage location of a node connected to the hyperedge in a second storage table; step 706: Read first target data of N nodes from the second storage table in the target file based on the first storage location information, where the first target data includes a number of the node and a relationship between the first hyperedge and the node; step 712: Determine raw edge data of the hyperedge based on at least the first target data of the N nodes and the target number; and step 714: Determine a set of raw edge data determined from all files in the several target file directories as query result data.

In step 702, the several target file directories whose time windows are included in the first time interval are determined from the file system based on the first time interval.

The first time interval is a time period, and is used to select the several target file directories whose time windows are included in the first time interval, so as to query a plurality of hyperedges located in the time interval.

In step 704, the data of the any hyperedge is read from the first storage table in the any target file in the any target file directory, where the data includes the target number of the hyperedge and the first storage location information, and the first storage location information indicates the storage location of the node connected to the hyperedge in the second storage table.

Corresponding to the above-mentioned storage method, the target file can be a hyperedge file shown in FIG. 3, the first storage table can be a hyperedge storage table, and the second storage table can be a node storage table. The hyperedge data includes the target number and the first storage location information.

In step 706, the first target data of the N nodes is read from the second storage table in the target file based on the first storage location information, where the first target data includes the number of the node and the relationship between the first hyperedge and the node.

In an embodiment, the first storage location information includes a first start location and a first total length, the first start location indicates a start location of a plurality of nodes connected to the first hyperedge in the second storage table, and the first total length indicates a total length of first target data of the plurality of nodes. Step 706 specifically includes: determining, based on the first start location, the first total length, and a preset first target data length of a single node, a quantity N of the plurality of nodes connected to the hyperedge and respective locations of the plurality of nodes in the second storage table, and reading the first target data of the N nodes from the second storage table in the target file.

For a specific method for determining a value of N, refer to step 506. Details are not described herein.

Then, in step 712, the raw edge data of the hyperedge is determined based on at least the first target data of the N nodes and the target number.

The raw edge data of the hyperedge can be determined based on the first target data of the N nodes connected to the hyperedge, that is, respective numbers of the N nodes and a relationship between the hyperedge and each of the N nodes, and the target number of the hyperedge.

In step 714, the set of raw edge data determined from all the files in the several target file directories is determined as the query result data.

In steps 702, 704, 706, and 712, implementation steps of reading raw edge data of any hyperedge are described. In step 714, all pieces of hyperedge data in all the files in the several target file directories within the first time interval are sequentially read according to the above-mentioned method, and the set of raw edge data is formed, and is determined as a query result and returned.

In some possible implementations, the hyperedge further includes a plurality of properties, and the target file further includes a third storage table that stores property data; and the method further includes step 708 and step 710.

In step 708, second storage location information is read from the hyperedge data of the hyperedge, where the second storage location information indicates a storage location of a property of the hyperedge in the third storage table.

The third storage table can be a property storage table in a hypergraph file.

In step 710, property data of M properties is read from the third storage table based on the second storage location information.

In an embodiment, the second storage location information includes a second start location and a second total length, the second start location indicates a start location of a plurality of properties of the hyperedge in the third storage table, and the second total length indicates a total data length of the plurality of properties. Step 710 specifically includes: determining, based on the second start location, the second total length, and a preset data length of a single property, a quantity M of the plurality of properties of the hyperedge and respective locations of the plurality of properties in the third storage table, and reading the property data of the M properties from the third storage table.

For a specific method for determining a value of M, refer to step 510. Details are not described herein.

When the property data of the M properties is read, step 712 includes: determining the raw edge data of the hyperedge based on at least the first target data of the N nodes, the property data of the M properties, and the target number.

The raw edge data of the hyperedge can be determined based on the first target data of the N nodes connected to the hyperedge, that is, the respective numbers of the N nodes and the relationship between the hyperedge and each of the N nodes, the property data of the M properties owned by the hyperedge, and the target number of the hyperedge.

In an embodiment, each of the plurality of file directories is further provided with a time to live TTL, and the time to live is used to set all files in the corresponding file directory to a non-queryable state upon expiration. In this case, step 702 specifically includes: determining several target file directories whose time windows are included in the first time interval and states are a queryable state from the file system based on the first time interval.

After a time to live of a file directory expires, all files in the file directory are set to the non-queryable state, and therefore do not appear in the query result in step 702.

By performing the query step shown in FIG. 7, a corresponding hyperedge can be queried based on a time interval, to meet a temporal access requirement of the hyperedge. In addition, in an embodiment in which a file directory is provided with a time to live TTL, an expiration time of the hyperedge can be controlled.

Figure 8:
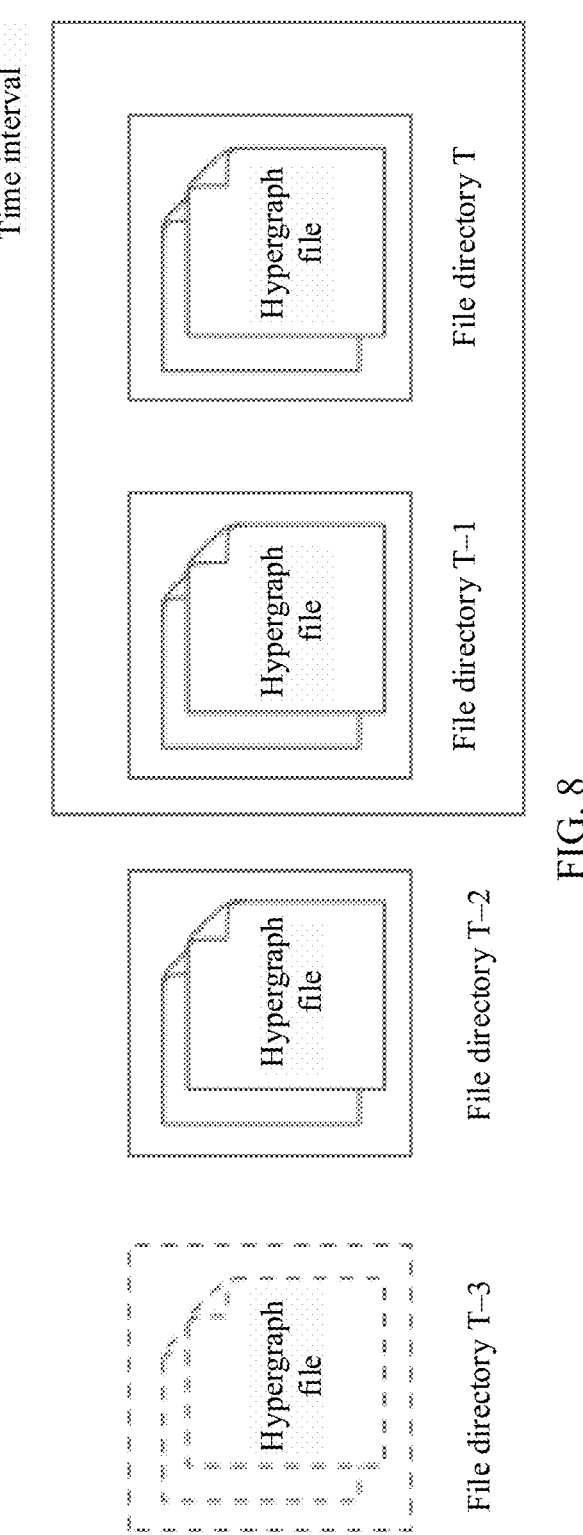
FIG. 8 is a schematic diagram of a scenario in which a hyperedge is queried based on a time interval according to an embodiment.

FIG. 8 is a schematic diagram of a scenario in which a hyperedge is queried based on a time interval according to an embodiment. In this embodiment, a size of a time window of a file directory is 1 day, a current day is a day T, a hyperedge generated on the day T is stored in a file directory T, a day that is 1 day before the day T is a day T-1, and a hyperedge generated on the day T-1 is stored in a file directory T-1. Similarly, there is further a file directory T-2 and a file directory T-3 that correspond to a day that is 2 days before the day T and a day that is 3 days before the day T.

The file directory is provided with a time to live TTL, and TTL=3 days, that is, all files in a file directory older than 3 days are set to the non-queryable state. Because TTL=3 days, all files in the file directory T-3 are in the non-queryable state, and are shown as dashed lines in FIG. 8. If a time interval to be queried ranges from the day T-1 to the day T, all hyperedges in all files in the file directory T-1 and the file directory T are returned as query results.

According to an embodiment in another aspect, a hypergraph data partitioning method with a temporal characteristics is further provided, and is used to divide hypergraph data in a file system into several partitions, and then each of a plurality of working devices in a distributed file system reads data in one partition. FIG. 9 is a flowchart of a hypergraph data partitioning method with a temporal characteristic according to an embodiment, used to divide hypergraph data stored in a file system according to the hypergraph data storage method with a temporal characteristic shown in FIG. 2 into a plurality of partitions. The file system includes a plurality of time windows, any file further includes a plurality of file blocks, and a plurality of hyperedges in any file block are stored in a number sequence in an ordered manner. The method includes at least the following steps: Step 902: Concatenate a plurality of file blocks in any target window in the plurality of time windows in a number sequence of hyperedges stored in the plurality of file blocks, to obtain a to-be-partitioned file, where the to-be-partitioned file includes a plurality of file blocks in a plurality of files; step 904: Determine, based on a partition quantity of the several partitions and a total quantity of file blocks included in the plurality of time windows, a target quantity L of file blocks to be allocated to any partition; step 906: Align a plurality of to-be-partitioned files based on a start location; and step 908: Perform a plurality of rounds of iteration until all file blocks in the file system are allocated to corresponding partitions, where any round of iteration includes the following steps: Step 9082: Determine a first target file block from one or more unpartitioned file blocks, so that start locations of at least L file blocks in the current unpartitioned file blocks are before an end location of the first target file block; and step 9084: Allocate the at least L file blocks to a same partition, and mark the at least L file blocks as "partitioned".

In step 902, the plurality of file blocks in the any target window in the plurality of time windows are concatenated in the number sequence of the hyperedges stored in the plurality of file blocks, to obtain the to-be-partitioned file, where the to-be-partitioned file includes the plurality of file blocks in the plurality of files.

Because a plurality of file blocks in a plurality of files in any time window are essentially merely an organization form for easy query, to avoid an excessively large data amount stored in a single file/file block. Therefore, a plurality of file blocks in a plurality of files in a same time window are concatenated into one to-be-partitioned file, which is not different from a plurality of original files in a storage form. Because the plurality of hyperedges stored in the file block are stored in the number sequence in an ordered manner, the hyperedges are also stored in the to-be-partitioned file in the number sequence in an ordered manner.

In step 904, the target quantity L of file blocks to be allocated to the any partition is determined based on the partition quantity of the several partitions and the total quantity of file blocks included in the plurality of time windows.

Specifically, a value obtained by rounding up a quotient obtained by dividing the total quantity of file blocks by the partition quantity is determined as the target quantity L. That is, all the file blocks are equally allocated to the plurality of partitions based on the quantity of file blocks.

In step 906, the plurality of to-be-partitioned files are aligned based on the start location.

In step 908, a plurality of rounds of iteration are performed until all file blocks in the file system are allocated to corresponding partitions, where any round of iteration includes step 9082 and step 9084.

In step 9082, the first target file block is determined from the one or more unpartitioned file blocks, so that the start locations of the at least L file blocks in the one or more unpartitioned file blocks are before the end location of the first target file block.

Specifically, first, a first candidate file block with an end location at a highest ranking is determined from the one or more unpartitioned file blocks, where a location of the file block is determined based on a number of a hyperedge stored in the file block, and an end location of the file block is a hyperedge number of a last hyperedge stored in the file block.

Then, a plurality of rounds of iteration are performed until a current cumulative quantity of file blocks is greater than or equal to L, where any round of iteration includes:

counting a quantity of file blocks whose start locations are before the end location of the first candidate file block in the unpartitioned file blocks, and recording the quantity in the current cumulative quantity; and if the current cumulative quantity is greater than or equal to L, determining the first candidate file block as the first target file block; or if the current cumulative quantity is less than L, determining a file block with an end location at a highest ranking as a new first candidate file block from remaining unpartitioned file blocks.

Then, in step 9084, the at least L file blocks are allocated to the same partition, and the at least L file blocks are marked as "partitioned".

Figure 10:
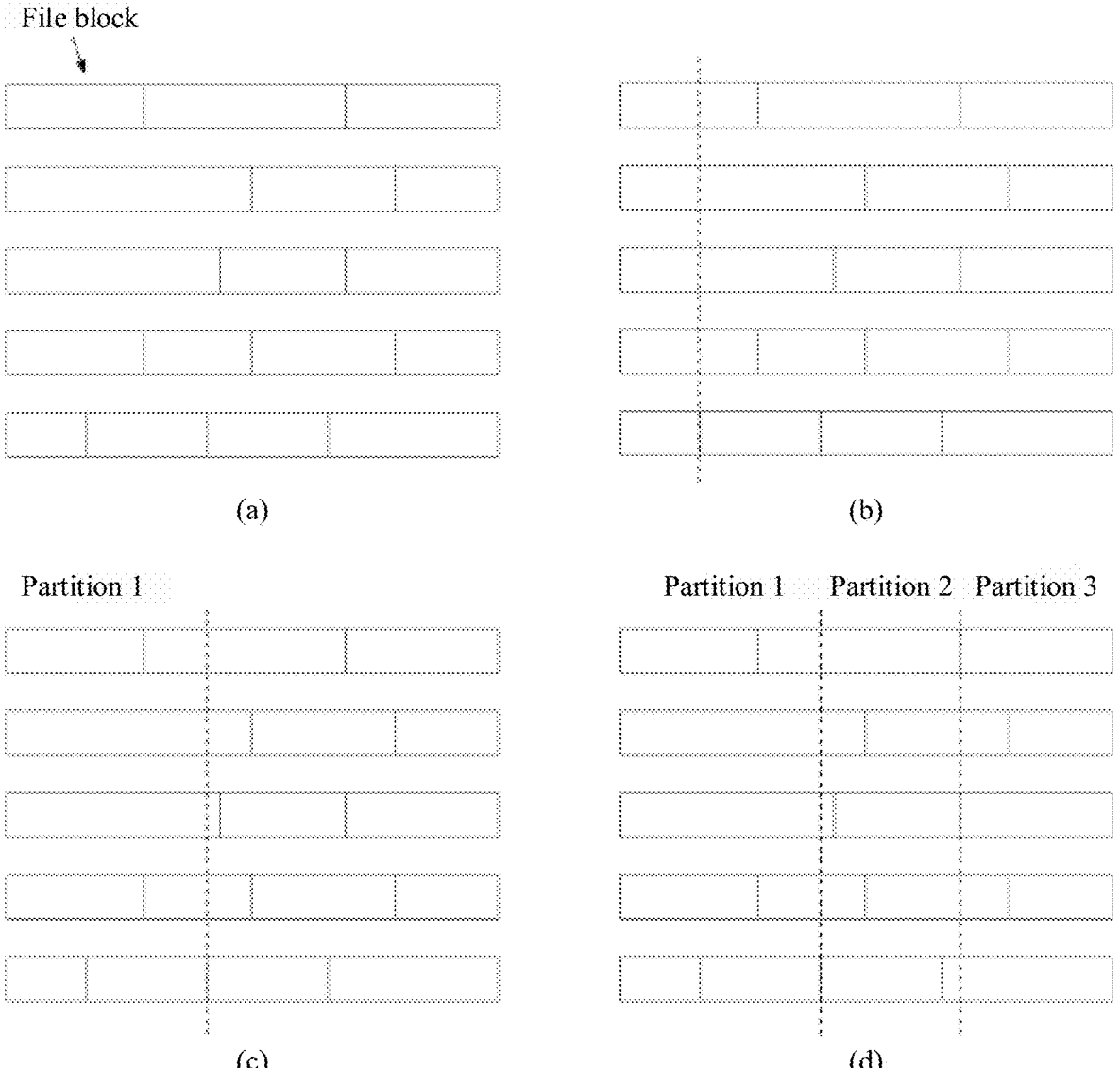
FIG. 10 is a schematic diagram of a scenario of hypergraph data partitioning according to an embodiment.

Implementations of the above-mentioned steps are described below based on a specific embodiment. FIG. 10 is a schematic diagram of a scenario of hypergraph data partitioning according to an embodiment. As shown in (a) in FIG. 10, file blocks in original five time windows are horizontally concatenated into five rectangular strips, and a small rectangle in any rectangular strip represents one file block. It should be noted that all file blocks are of a same size. A length of the small rectangle in FIG. 10 represents a number interval of a hyperedge stored in the rectangle. For example, if a hyperedge stored in a file block is connected to a small quantity of nodes, a relatively large quantity of hyperedges are stored in the file block, and a corresponding small rectangle has a longer length. On the contrary, if a hyperedge stored in another file block is connected to a large quantity of nodes, a relatively small quantity of hyperedges are stored in the file block, and a corresponding small rectangle has a shorter length. The five rectangular strips are aligned based on a start location, to obtain an arrangement manner shown in (a) in FIG. 10.

In this embodiment, the file blocks are to be divided into three partitions. If a total quantity of file blocks in all to-be-partitioned files is counted as 17, a quantity L of file blocks to be allocated to each partition is a value equal to 6 obtained by rounding up 17/3.

First, a file block with an end location at a highest ranking is determined as a candidate file block from one or more unpartitioned file blocks, and is a first small rectangle in a last rectangular strip in (a) in FIG. 10, and a dashed division line that runs through all the rectangular strips is drawn from the end of the small rectangle, as shown in (b) in FIG. 10. A quantity of file blocks on the left side of the dashed line is counted as 5, which is less than L that is 6. There is an insufficient quantity. In this case, a file block with an end location at a highest ranking continues to be determined as a new candidate file block from next small rectangles of all the rectangles, and is a second small rectangle in the last rectangular strip, and a dashed division line that runs through all the rectangular strips is drawn from the end of the small rectangle, as shown in (c) in FIG. 10. A quantity of file blocks on the left side of the dashed line is counted as 8, which is greater than L that is 6, and the quantity meets the requirement. In this case, the small rectangle is used as a target file block, a dashed division line that runs through all the rectangular strips is drawn from the end of the small rectangle, all hyperedge data on the left side of the dashed line is allocated to a partition 1, and these file blocks are marked as "partitioned".

Then, a file block with an end location at a highest ranking is determined as a candidate file block from one or more unpartitioned file blocks, and is a second small rectangle in a third rectangular strip in (c) in FIG. 10, and a dashed division line that runs through all the rectangular strips is drawn from the end of the small rectangle, as shown in (d) in FIG. 10. A quantity of file blocks between the two dashed lines is counted as 9, which is greater than L that is 6, and the quantity meets the requirement. In this case, the small rectangle is used as a target file block, a dashed division line that runs through all the rectangular strips is drawn from the end of the small rectangle, and all hyperedge data on the left side of the dashed line and on the right side of the previous dashed line is allocated to a partition 2. All hyperedge data on the right side of the dashed line is allocated to a partition 3.

It should be noted that after partitioning is performed according to the above-mentioned solution, data in some file blocks is allocated to two partitions, and the data in these file blocks is respectively read by two working devices in the distributed system based on division of the dashed line.

Figure 11:
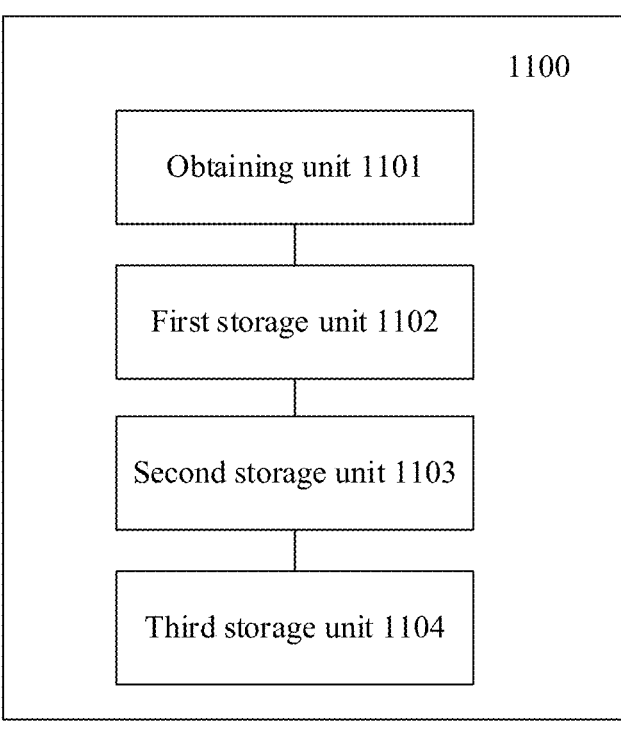
FIG. 11 is a schematic block diagram of a hypergraph data storage apparatus with a temporal characteristic according to an embodiment.

According to an embodiment in another aspect, a hypergraph data storage apparatus with a temporal characteristic is further provided. FIG. 11 is a schematic block diagram of a hypergraph data storage apparatus with a temporal characteristic according to an embodiment. The apparatus can be deployed in any device, platform, or device cluster with a computing and processing capability. As shown in FIG. 11, a hypergraph includes a node and a hyperedge, the hyperedge is an edge connected to any quantity of nodes, and the apparatus 1100 includes:

an obtaining unit 1101, configured to obtain raw edge data of a first hyperedge, where the raw edge data indicates N nodes connected to the first hyperedge in the hypergraph and a relationship between the first hyperedge and any node, and includes a first number and a first time;

a first storage unit 1102, configured to: store first target data of the N nodes in a second storage table in a first file, and determine first storage location information of the N nodes in the second storage table, where the first target data includes a number of the node and a relationship between the first hyperedge and the node;

a second storage unit 1103, configured to: form first hyperedge data based on the first number and the first storage location information, and store the first hyper-edge data in a first storage table in the first file; and a third storage unit 1104, configured to store the first file in a first file directory in a file system based on the first time, where the first file directory corresponds to a first time window, and the first time falls within the first time window.

Figure 12:
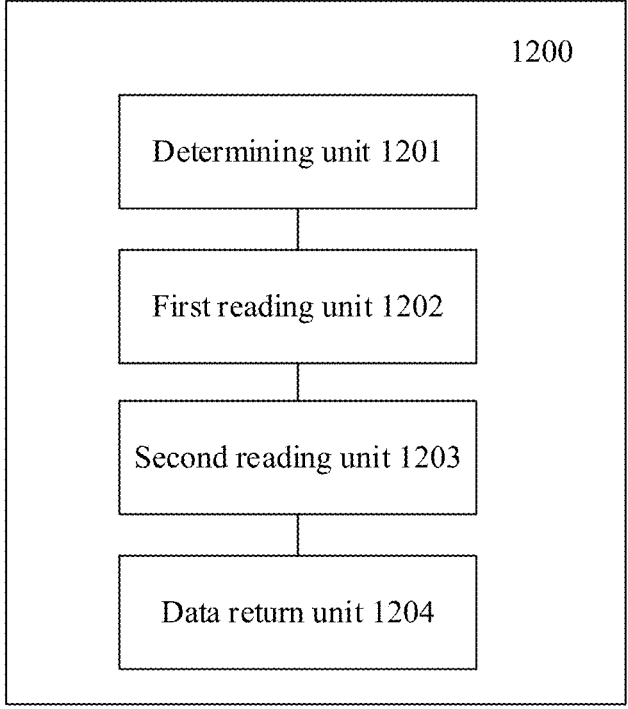
FIG. 12 is a schematic block diagram of a hypergraph data query apparatus according to an embodiment.

According to an embodiment in another aspect, a hypergraph data query apparatus is further provided. FIG. 12 is a schematic block diagram of a hypergraph data query apparatus according to an embodiment. The apparatus can be deployed in any device, platform, or device cluster with a computing and processing capability. As shown in FIG. 12, a hypergraph includes a node and a hyperedge, the hyperedge is an edge connected to any quantity of nodes, and the apparatus 1200 is configured to query a corresponding first hyperedge from a plurality of file directories in a file system based on a first number, and includes:

a determining unit 1201, configured to: determine, based on the first number, a first storage table that stores first hyperedge data, and read the first hyperedge data from the first storage table, where the first storage table is located in a first file, the first file is located in a first file directory, the first file further includes a second storage table that stores first target data of a node;

a first reading unit 1202, configured to read first storage location information from the first hyperedge data, where the first storage location information indicates a storage location of a node connected to the first hyperedge in the second storage table;

a second reading unit 1203, configured to read first target data of N nodes from the second storage table based on the first storage location information, where the first target data includes a number of the node and a relationship between the first hyperedge and the node; and a data return unit 1204, configured to return raw edge data of the first hyperedge based on at least the first target data of the N nodes.

Figure 13:
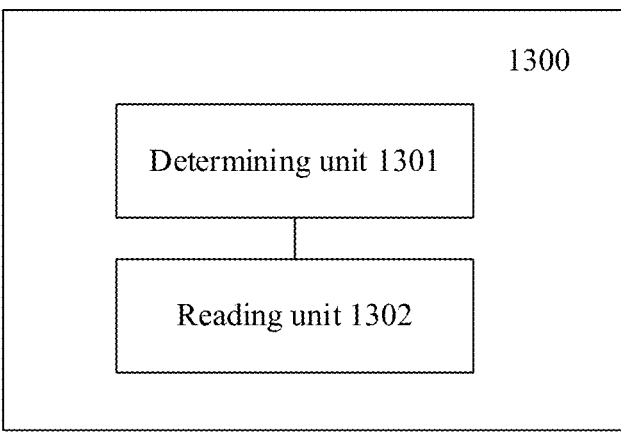
FIG. 13 is a schematic block diagram of a hypergraph data query apparatus according to another embodiment.

According to an embodiment in another aspect, a hypergraph data query apparatus is further provided. FIG. 13 is a schematic block diagram of a hypergraph data query apparatus according to another embodiment. The apparatus can be deployed in any device, platform, or device cluster with a computing and processing capability. As shown in FIG. 13, a hypergraph includes a node and a hyperedge, the hyperedge is an edge connected to any quantity of nodes, and the apparatus 1300 is configured to query all hyperedges connected to a second node from a plurality of file directories in a file system based on a second number of the second node, and includes:

a determining unit 1301, configured to: determine, based on the second number, a fifth storage table that stores third storage location information, and read the third storage location information from the fifth storage table, where the fifth storage table is located in a second file, the second file further includes a sixth storage table that stores second target data of a hyperedge, the third storage location information indicates a storage location of a hyperedge connected to the second node in the sixth storage table, and the second target data includes a number of the hyperedge and a relationship between the hyperedge and the first node; and a reading unit 1302, configured to read second target data of H hyperedges from the sixth storage table based on the third storage location information, where the second target data includes hyperedge numbers of the H hyperedges.

Figure 14:
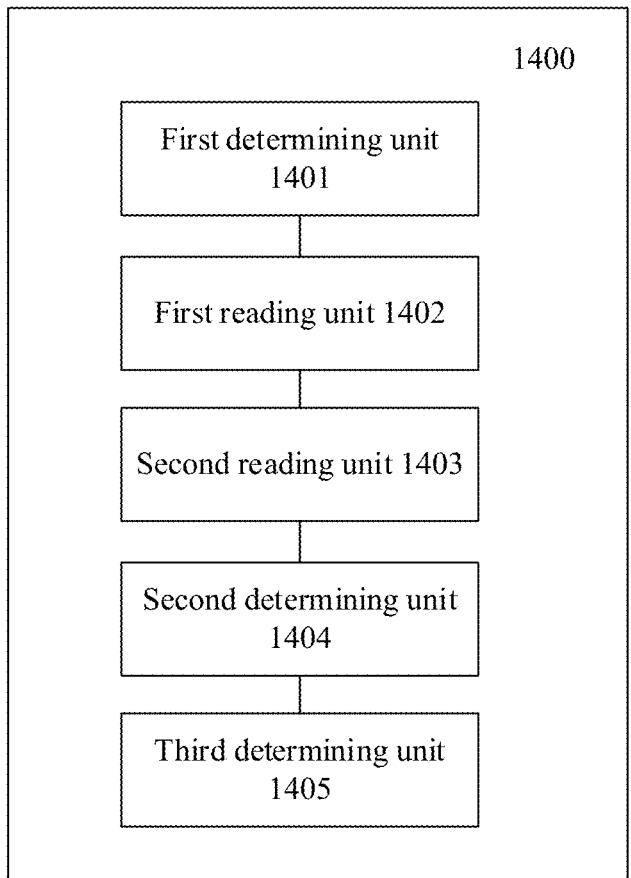
FIG. 14 is a schematic block diagram of a hypergraph data query apparatus with a temporal characteristic according to an embodiment.

According to an embodiment in another aspect, a hypergraph data query apparatus with a temporal characteristic is further provided. FIG. 14 is a schematic block diagram of a hypergraph data query apparatus with a temporal characteristic according to an embodiment. The apparatus can be deployed in any device, platform, or device cluster with a computing and processing capability. As shown in FIG. 14, a hypergraph includes a node and a hyperedge, the hyperedge is an edge connected to any quantity of nodes, the apparatus is configured to query a plurality of corresponding hyperedges from a file system based on a first time interval, each file directory in the file system has a corresponding time window, and the apparatus 1400 includes:

a first determining unit 1401, configured to determine several target file directories whose time windows are included in the first time interval from the file system based on the first time interval;

a first reading unit 1402, configured to read data of any hyperedge from a first storage table in any target file in any target file directory, where the data includes a target number of the hyperedge and first storage location information, and the first storage location information indicates a storage location of a node connected to the hyperedge in a second storage table;

a second reading unit 1403, configured to read first target data of N nodes from the second storage table in the target file based on the first storage location information, where the first target data includes a number of the node and a relationship between the first hyperedge and the node;

a second determining unit 1404, configured to determine raw edge data of the hyperedge based on at least the first target data of the N nodes and the target number; and a third determining unit 1405, configured to determine a set of raw edge data determined from all files in the several target file directories as query result data.

Figure 15:
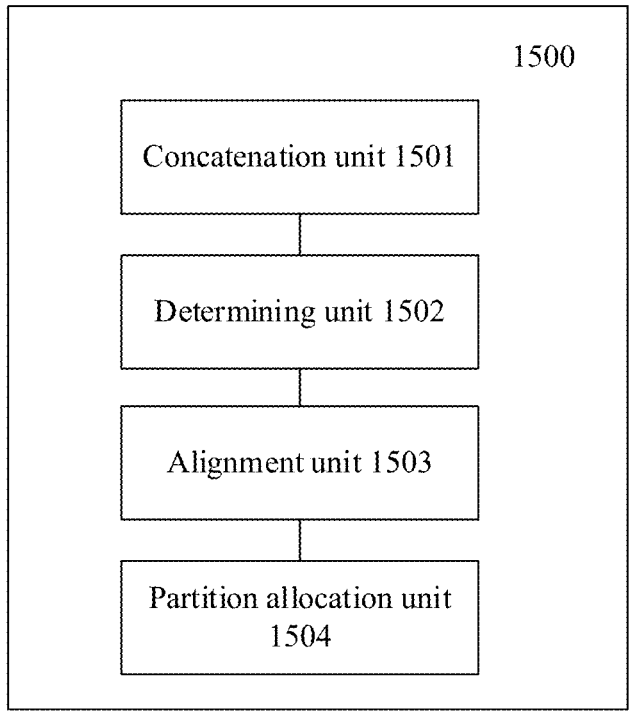
FIG. 15 is a schematic block diagram of a hypergraph data partitioning apparatus with a temporal characteristic according to an embodiment.

According to an embodiment in another aspect, a hypergraph data partitioning apparatus with a temporal characteristic is further provided. FIG. 15 is a schematic block diagram of a hypergraph data partitioning apparatus with a temporal characteristic according to an embodiment. The apparatus can be deployed in any device, platform, or device cluster with a computing and processing capability, and is configured to divide hypergraph data stored in a file system according to the apparatus in FIG. 11 into several partitions. The file system includes a plurality of time windows, any file further includes a plurality of file blocks, and a plurality of hyperedges in any file block are stored in a number sequence in an ordered manner. As shown in FIG. 15, the apparatus 1500 includes:

a concatenation unit 1501, configured to concatenate a plurality of file blocks in any target window in the plurality of time windows in a number sequence of hyperedges stored in the plurality of file blocks, to obtain a to-be-partitioned file, where the to-be-partitioned file includes a plurality of file blocks in a plurality of files;

a determining unit 1502, configured to determine, based on a partition quantity of the several partitions and a total quantity of file blocks included in the plurality of time windows, a target quantity L of file blocks to be allocated to any partition;

an alignment unit 1503, configured to align a plurality of to-be-partitioned files based on a start location; and a partition allocation unit 1504, configured to perform a plurality of rounds of iteration until all file blocks in the file system are allocated to corresponding partitions, where any round of iteration includes:

determining a first target file block from one or more unpartitioned file blocks, so that start locations of at least L file blocks in the one or more unpartitioned file blocks are before an end location of the first target file block; and allocating the at least L file blocks to a same partition, and marking the at least L file blocks as "partitioned".

According to an embodiment in another aspect, a computer-readable storage medium is further provided. The computer-readable storage medium stores a computer program. When the computer program is executed in a computer, the computer is enabled to perform the method described in any one of the above-mentioned embodiments.

According to an embodiment in still another aspect, a computing device is further provided, and includes a memory and a processor. The memory stores executable code. When the processor executes the executable code, the method described in any one of the above-mentioned embodiments is implemented.

The embodiments of this specification are described in a progressive manner. For same or similar parts in the embodiments, mutual references can be made to the embodiments. Each embodiment focuses on a difference from other embodiments. Particularly, the apparatus embodiments are basically similar to the method embodiments, and therefore are described briefly. For related parts, references can be made to related descriptions in the method embodiments.

Specific embodiments of this specification are described above. Other embodiments fall within the scope of the appended claims. In some cases, the actions or steps described in the claims can be performed in a sequence different from that in the embodiments and desired results can still be achieved. In addition, the process depicted in the accompanying drawings does not necessarily need a particular sequence or consecutive sequence to achieve the desired results. In some implementations, multi-tasking and concurrent processing are feasible or may be advantageous.

It should be noted that in this specification, relationship terms such as first and second are merely used to distinguish an entity or operation from another entity or operation, and do not necessarily require or imply that there is any such actual relationship or sequence between these entities or operations. In addition, the term "include", "comprise", or any other variants thereof is intended to cover a non-exclusive inclusion, so that a process, a method, a product, or an apparatus that includes a series of elements not only includes those elements, but also includes other elements not expressly listed, or further includes elements inherent to such a process, method, product, or apparatus. Without more constraints, an element preceded by "includes a . . . " does not preclude the presence of additional identical elements in the process, method, product, or apparatus that includes the element.

A person of ordinary skill in the art can understand that all or some of the steps in the embodiments can be completed by hardware, or can be completed by a program instructing related hardware. The program can be stored in a computer-readable storage medium. The storage medium can be a read-only memory, a magnetic disk, an optical disc, etc.

In the above-mentioned specific implementations, the objective, technical solutions, and beneficial effects of this specification are further described in detail. It should be understood that the above-mentioned descriptions are merely specific implementations of this specification, but are not intended to limit the protection scope of this specification. Any modification, equivalent replacement, improvement, etc. made without departing from the spirit and principle of this specification shall fall within the protection scope of this specification.

What is claimed is:

1. A hypergraph data storage method with a temporal characteristic, wherein a hypergraph comprises a node and a hyperedge, the hyperedge is an edge connected to any quantity of nodes, and the method comprises:

obtaining raw edge data of a first hyperedge, wherein the raw edge data indicates N nodes connected to the first hyperedge in the hypergraph and a relationship between the first hyperedge and any node, and comprises a first number and a first time;

storing first target data of the N nodes in a second storage table in a first file, and determining first storage location information of the N nodes in the second storage table, wherein the first target data comprises a number of the node and a relationship between the first hyperedge and the node;

forming first hyperedge data based on the first number and the first storage location information, and storing the first hyperedge data in a first storage table in the first file; and storing the first file in a first file directory in a file system based on the first time, wherein the first file directory corresponds to a first time window, and the first time falls within the first time window.

2. The method according to claim 1, wherein the determining first storage location information of the N nodes in the second storage table comprises:

determining a first start location of the N nodes in the second storage table;

determining a first total length of the N nodes in the second storage table based on a value of N and a preset first target data length of a single node; and determining the first start location and the first total length as the first storage location information.

3. The method according to claim 1, wherein the raw edge data of the first hyperedge further comprises M properties; and the method further comprises:

storing data of the M properties in a third storage table in the first file, and determining second storage location information of the M properties in the third storage table; and storing the second storage location information in the first hyperedge data in the first storage table.

4. The method according to claim 3, wherein the first file further comprises a first file block; and the first storage table, the second storage table, and the third storage table are located in the first file block.

5. The method according to claim 4, wherein the first file block further comprises a fourth storage table; and the method further comprises:

determining a start location and a length of each of the first storage table, the second storage table, and the third storage table in the first file block, and storing the start location and the length in the fourth storage table.

6. The method according to claim 1, wherein the first storage table comprises a plurality of pieces of hyperedge data and a plurality of corresponding numbers, and the plurality of pieces of hyperedge data are sorted in the first storage table in a sequence of the corresponding numbers.

7. The method according to claim 1, wherein the first file directory further comprises a Bloom filter, and the Bloom filter is configured to determine whether any target hyperedge is stored in any file in the first file directory.

8. The method according to claim 1, wherein the first file directory is further provided with a time to live TTL, and the time to live is used to set all files in the first file directory to a non-queryable state upon expiration.

9. The method according to claim 1, further comprising:
determining H hyperedges connected to a first node;
storing second target data of the H hyperedges in a sixth storage table in a second file, and determining third storage location information of the H hyperedges in the sixth storage table, wherein the second target data comprises a number of the hyperedge and a relationship between the hyperedge and the first node; and
associatively storing a number of the first node and the third storage location information in a fifth storage table in the second file.

10. The method according to claim 9, wherein the second file further comprises a second file block; and the fifth storage table and the sixth storage table are located in the second file block.

11. The method according to claim 10, wherein the second file block further comprises a seventh storage table; and the method further comprises:
determining a start location and a length of each of the fifth storage table and the sixth storage table in the second file block, and storing the start location and the length in the seventh storage table.

12. A hypergraph data query method, wherein a hypergraph comprises a node and a hyperedge, the hyperedge is an edge connected to any quantity of nodes, and the method is used to query a corresponding first hyperedge from a plurality of file directories in a file system based on a first number, and comprises:
determining, based on the first number, a first storage table that stores first hyperedge data, and reading the first hyperedge data from the first storage table, wherein the first storage table is located in a first file, the first file is located in a first file directory, the first file further comprises a second storage table that stores first target data of a node, and the first target data comprises a number of the node and a relationship between the first hyperedge and the node;
reading first storage location information from the first hyperedge data, wherein the first storage location information indicates a storage location of a node connected to the first hyperedge in the second storage table;
reading first target data of N nodes from the second storage table based on the first storage location information; and
returning raw edge data of the first hyperedge based on at least the first target data of the N nodes.

13. The method according to claim 12, wherein the first storage location information comprises a first start location and a first total length, the first start location indicates a start location of a plurality of nodes connected to the first hyperedge in the second storage table, and the first total length indicates a total length of first target data of the plurality of nodes; and the reading first target data of N nodes from the second storage table based on the first storage location information comprises:
determining, based on the first start location, the first total length, and a preset first target data length of a single node, a quantity N of the plurality of nodes connected to the first hyperedge and respective locations of the plurality of nodes in the second storage table, and reading the first target data of the N nodes from the second storage table.

14. The method according to claim 12, wherein the first hyperedge further comprises a plurality of properties, and the first file further comprises a third storage table that stores property data; and the method further comprises:
reading second storage location information from the first hyperedge data, wherein the second storage location information indicates a storage location of a property of the first hyperedge in the third storage table; and
reading property data of M properties from the third storage table based on the second storage location information; and
the returning raw edge data of the first hyperedge based on at least the first target data of the N nodes comprises:
returning the raw edge data of the first hyperedge based on the first target data of the N nodes and the property data of the M properties.

15. The method according to claim 12, wherein the plurality of file directories in the file system further comprise Bloom filters, and the Bloom filter is configured to determine whether any target hyperedge is stored in any file in a target file directory; and the determining, based on the first number, a first storage table that stores first hyperedge data comprises:
separately inputting the first number to the Bloom filters in the plurality of file directories, and determining, based on output results of the Bloom filters, a plurality of candidate file directories that may comprise the first hyperedge data; and
separately searching the plurality of candidate file directories based on the first number, to determine the first storage table that stores the first hyperedge data.

16. A hypergraph data query method with a temporal characteristic, wherein a hypergraph comprises a node and a hyperedge, the hyperedge is an edge connected to any quantity of nodes, the method is used to query a plurality of corresponding hyperedges from a file system based on a first time interval, each file directory in the file system has a corresponding time window, and the method comprises:
determining several target file directories whose time windows are comprised in the first time interval from the file system based on the first time interval;
reading data of any first hyperedge from a first storage table in any target file in any target file directory, wherein the data comprises a target number of the first hyperedge and first storage location information, and the first storage location information indicates a storage location of a node connected to the first hyperedge in a second storage table;
reading first target data of N nodes from the second storage table in the target file based on the first storage location information, wherein the first target data comprises a number of the node and a relationship between the first hyperedge and the node;
determining raw edge data of the hyperedge based on at least the first target data of the N nodes and the target number; and
determining a set of raw edge data determined from all files in the several target file directories as query result data.

17. The method according to claim 16, wherein the first storage location information comprises a first start location and a first total length, the first start location indicates a start location of a plurality of nodes connected to the first hyperedge in the second storage table, and the first total length indicates a total length of first target data of the plurality of nodes; and the reading first target data of N nodes from the second storage table in the target file based on the first storage location information comprises:

determining, based on the first start location, the first total length, and a preset first target data length of a single node, a quantity N of the plurality of nodes connected to the hyperedge and respective locations of the plurality of nodes in the second storage table, and reading the first target data of the N nodes from the second storage table in the target file.

18. The method according to claim 16, wherein the hyperedge further comprises a plurality of properties, and the target file further comprises a third storage table that stores property data; and the method further comprises:

reading second storage location information from the hyperedge data of the hyperedge, wherein the second storage location information indicates a storage location of a property of the hyperedge in the third storage table; and reading property data of M properties from the third storage table based on the second storage location information; and the determining raw edge data of the hyperedge based on at least the first target data of the N nodes and the target number comprises:

determining the raw edge data of the hyperedge based on at least the first target data of the N nodes, the property data of the M properties, and the target number.

19. The method according to claim 16, wherein each of the plurality of file directories is further provided with a time to live TTL, and the time to live is used to set all files in the corresponding file directory to a non-queryable state upon expiration; and the determining several target file directories whose time windows are comprised in the first time interval from the file system based on the first time interval comprises:

determining several target file directories whose time windows are comprised in the first time interval and states are a queryable state from the file system based on the first time interval.

* * * * *